United States Patent
Berglund et al.

(10) Patent No.: US 8,107,785 B2
(45) Date of Patent: Jan. 31, 2012

(54) DROP ACCESS LOCATION METHOD AND SYSTEM FOR HORIZONTAL CABLING IN MULTI-DWELLING UNIT APPLICATIONS

(75) Inventors: Sidney J. Berglund, Round Rock, TX (US); Victor J. Borer, Austin, TX (US); Zachary M. Thompson, Austin, TX (US); Linnea M. Wilkes, Cedar Park, TX (US); Curtis L. Shoemaker, Round Rock, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 410 days.

(21) Appl. No.: 12/489,950

(22) Filed: Jun. 23, 2009

(65) Prior Publication Data
US 2009/0324188 A1 Dec. 31, 2009

Related U.S. Application Data

(60) Provisional application No. 61/075,466, filed on Jun. 25, 2008, provisional application No. 61/094,256, filed on Sep. 4, 2008, provisional application No. 61/116,419, filed on Nov. 20, 2008.

(51) Int. Cl.
*G02B 6/00* (2006.01)
*H02G 3/08* (2006.01)
(52) U.S. Cl. ........................................ 385/135; 174/481
(58) Field of Classification Search .................. 174/481; 385/135
See application file for complete search history.

(56) References Cited

U.S. PATENT DOCUMENTS

| | | | |
|---|---|---|---|
| 3,133,753 A | 5/1964 | Goodman et al. | |
| 3,491,971 A | 1/1970 | Fisher | |
| 3,654,379 A * | 4/1972 | Rodgers | 174/372 |
| 3,778,528 A | 12/1973 | Heifetz et al. | |
| 4,459,165 A | 7/1984 | Meis et al. | |
| 4,618,741 A * | 10/1986 | Bramwell | 174/68.3 |

(Continued)

FOREIGN PATENT DOCUMENTS
DE 1 901 854 A1 8/1969
(Continued)

OTHER PUBLICATIONS

Form PCT/ISA/206, dated Dec. 14, 2009, issued in PCT/US2009/048298.

(Continued)

*Primary Examiner* — Omar Rojas
(74) *Attorney, Agent, or Firm* — Gregg H. Rosenblatt

(57) ABSTRACT

A drop access location system and method, where the system includes a duct containing one or more communications lines, where the duct is mountable to a generally flat surface. The system also includes a drop access box including a base and a removable cover having a low impact profile and or decorative appearance. A mounting section of the base is configured to fit over an outer shape of the duct and overhang therefrom. Slack storage is provided and includes one or more guides to route an accessed communications line to a coupling and to store excess amounts of the accessed communications line. The coupling device mounting area is configured to receive a coupling, adapter, or splice that connects the accessed communications line to a drop cable. The drop access location system and method can be utilized for horizontal cabling in multi-dwelling unit (MDU), multi-tenant unit (MTU) and other building applications. A system for installing the drop access location system is also provided.

21 Claims, 19 Drawing Sheets

U.S. PATENT DOCUMENTS

| | | | |
|---|---|---|---|
| 4,911,525 | A | 3/1990 | Hicks et al. |
| 5,593,756 | A | 1/1997 | Miller |
| 5,702,994 | A | 12/1997 | Klosel |
| 5,721,394 | A | 2/1998 | Mulks |
| 6,504,098 | B2 | 1/2003 | Seamans |
| 6,911,597 | B2 | 6/2005 | Seamans et al. |
| 7,369,738 | B2 | 5/2008 | Larson et al. |
| 7,397,993 | B1 | 7/2008 | Navé et al. |
| 7,406,241 | B1 | 7/2008 | Opaluch et al. |
| 7,668,432 | B2 * | 2/2010 | Mullaney .................... 385/135 |
| 2002/0181905 | A1 | 12/2002 | Yoshida et al. |
| 2003/0049008 | A1 | 3/2003 | Zeidan |
| 2005/0213920 | A1 | 9/2005 | Tanaka et al. |
| 2008/0069513 | A1 | 3/2008 | Desanti |
| 2008/0159740 | A1 | 7/2008 | Bell et al. |
| 2008/0187276 | A1 | 8/2008 | Roberts et al. |
| 2009/0003782 | A1 | 1/2009 | Bell et al. |
| 2009/0060445 | A1 | 3/2009 | Mullaney et al. |
| 2009/0211171 | A1 | 8/2009 | Summers |
| 2009/0294016 | A1 | 12/2009 | Sayres et al. |
| 2010/0109174 | A1 | 5/2010 | Abernathy et al. |

FOREIGN PATENT DOCUMENTS

| | | |
|---|---|---|
| DE | 44 10 558 A1 | 9/1995 |
| DE | 196 03 262 A1 | 7/1997 |
| DE | 198 43 263 A1 | 4/2000 |
| EP | 0 490 609 A | 6/1992 |
| EP | 0 992 826 A2 | 4/2000 |
| EP | 1 447 893 A1 | 8/2004 |
| FR | 1 304 739 A1 | 8/1962 |
| FR | 2 097 002 A1 | 3/1972 |
| FR | 2 141 599 A1 | 1/1973 |
| FR | 2 418 973 A1 | 9/1979 |
| FR | 2 568 730 A1 | 2/1986 |
| FR | 2 688 897 B1 | 9/1993 |
| FR | 2 916 284 A1 | 11/2008 |
| GB | 2 352 867 A | 2/2001 |
| GB | 2 377 089 A | 12/2002 |
| GB | 2 409 587 A | 6/2005 |
| JP | 59 031902 A | 2/1984 |
| JP | 4016262 B2 | 12/2007 |
| JP | 2008-309894 A | 12/2008 |
| KR | 20-0399079 Y1 | 10/2005 |
| WO | WO 83/01868 | 5/1983 |
| WO | WO 85/04981 | 11/1985 |
| WO | WO 97/44872 | 11/1997 |
| WO | WO 03/046622 A1 | 6/2003 |
| WO | WO 2005/096054 A1 | 10/2005 |
| WO | WO 2008/124293 | 10/2008 |
| WO | WO 2009/018421 A1 | 2/2009 |
| WO | WO 2010/068585 A1 | 6/2010 |

OTHER PUBLICATIONS

Form PCT/ISA/210, dated Feb. 24, 2010, issued in PCT/US2009/048298.

Publication: "Flat Cable System is Introduced," 3M Megaphone Newspaper, Dec. 1962; 1 page.

Publication: "New Flat Cable is Available," 3M Megaphone Newspaper, Jun. 1964; 1 page.

Publication: "3M Cable Unsnarls Wiring Woes with the Neat System," The Tartan Magazine, 3rd Quarter 1965; 3 pages.

\* cited by examiner

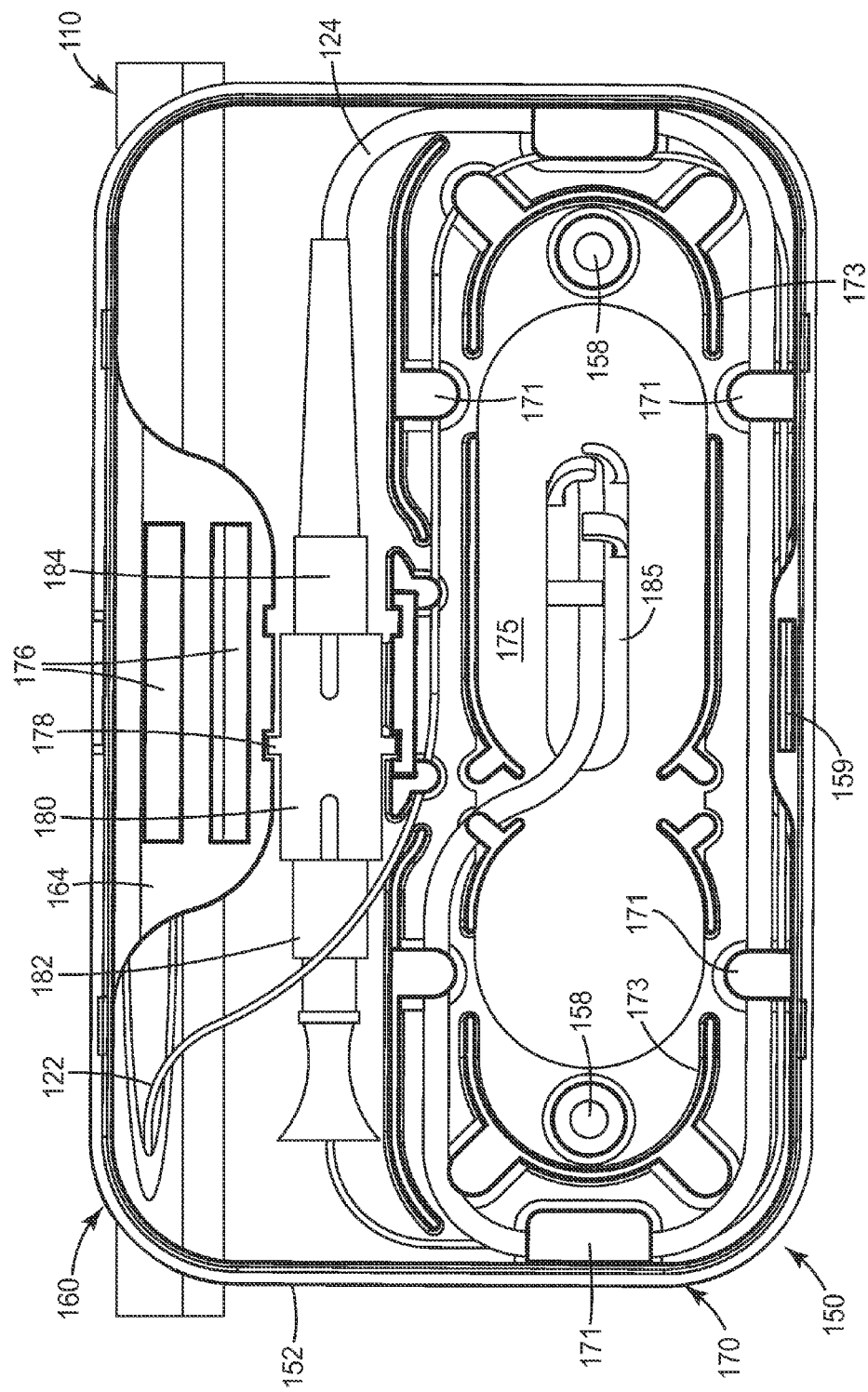

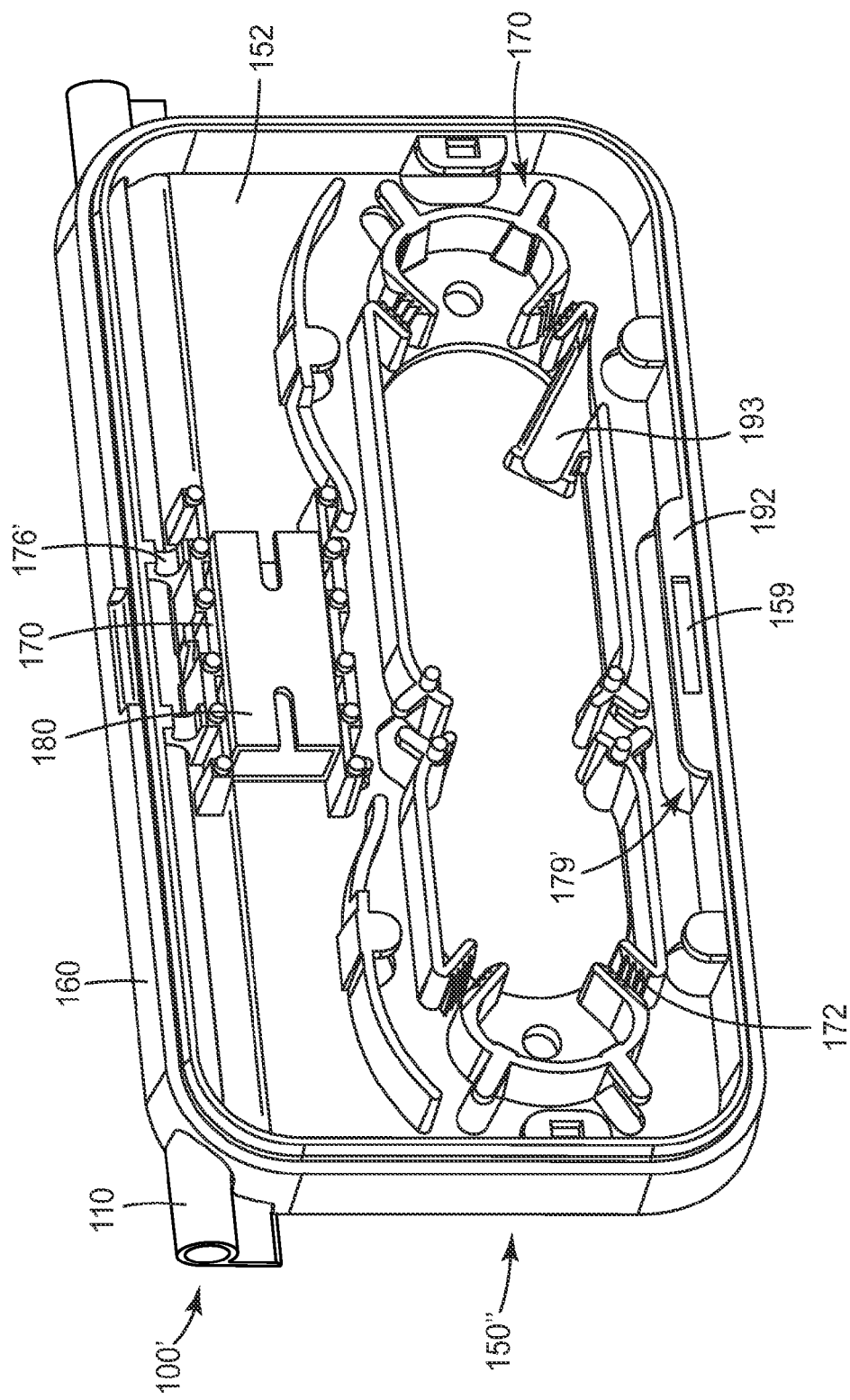

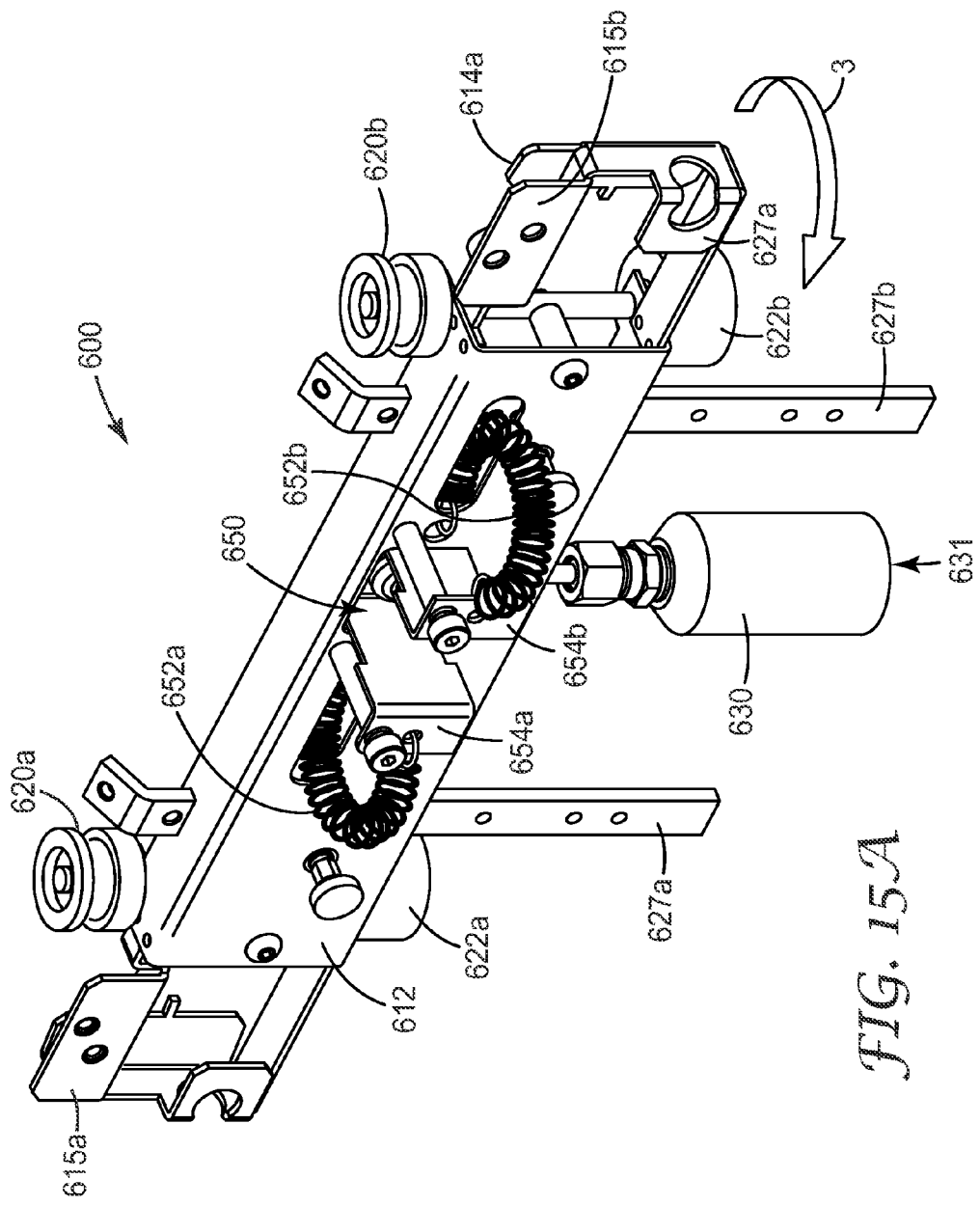

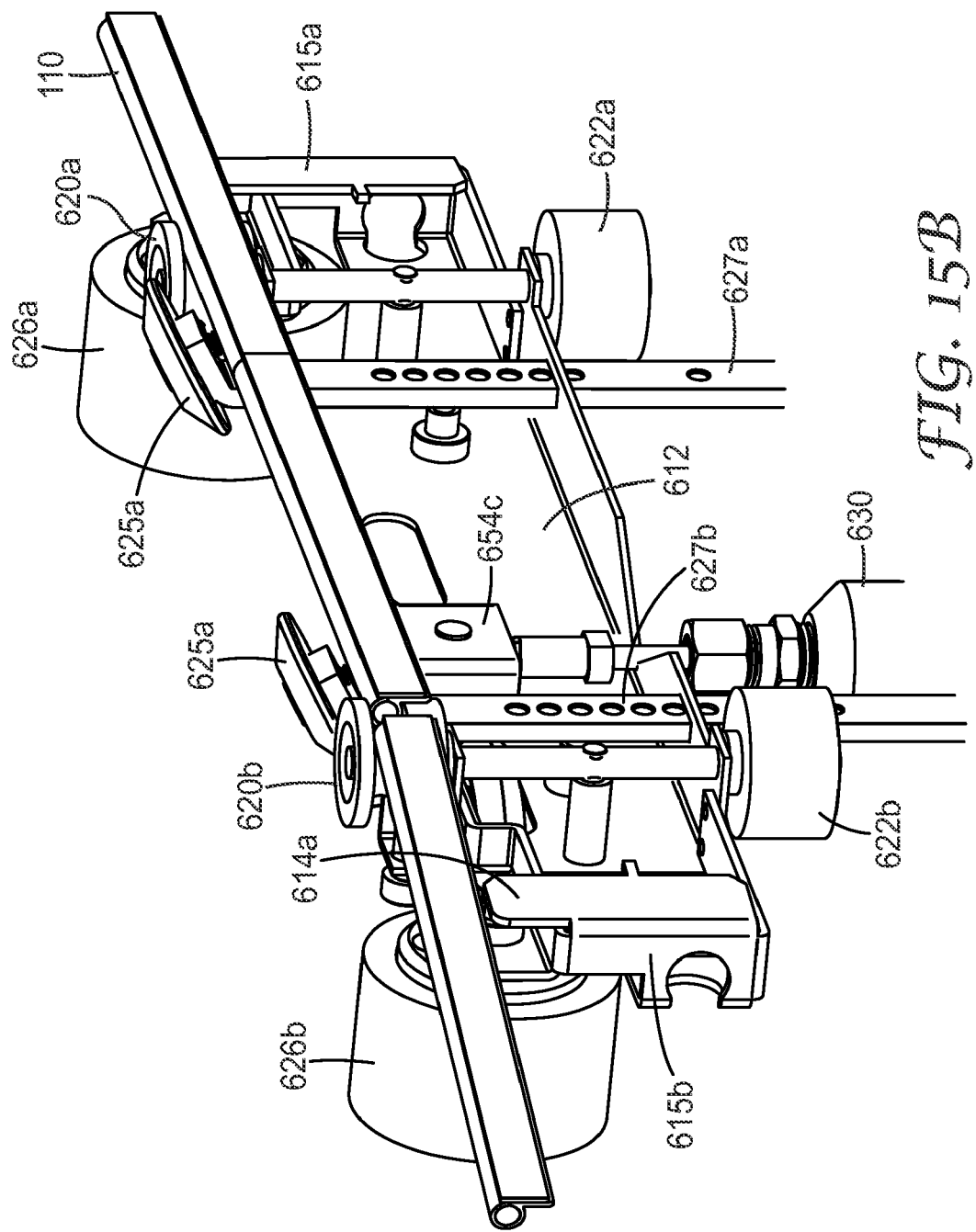

DROP ACCESS LOCATION METHOD AND SYSTEM FOR HORIZONTAL CABLING IN MULTI-DWELLING UNIT APPLICATIONS

CROSS REFERENCE TO RELATED APPLICATIONS

This application claims the benefit of U.S. Provisional Patent Application No. 61/075,466, filed Jun. 25, 2008; U.S. Provisional Patent Application No. 61/094,256, filed Sep. 4, 2008; and U.S. Provisional Patent Application No. 61/116,419, filed Nov. 20, 2008. The disclosures of each of the aforementioned Provisional Applications are incorporated by reference herein in their entirety.

BACKGROUND OF THE INVENTION

1. Field of the Invention

The present invention is directed to a drop access location system and method of installing the same, for horizontal cabling in multi-dwelling unit (MDU) applications.

2. Background

Several hundred million multiple dwelling units (MDUs) exist globally, which are inhabited by about one third of the world's population. Due to the large concentration of tenants in one MDU, Fiber-to-the-X ("FTTX") deployments to these structures are more cost effective to service providers than deployments to single-family homes. Connecting existing MDUs to the FTTX network can often be difficult. Challenges can include gaining building access, limited distribution space in riser closets, and space for cable routing and management. Specifically, FTTX deployments within existing structures make it difficult to route cables within the walls or floors, or above the ceiling from a central closet or stairwell, to each living unit.

Conventionally, a service provider installs an enclosure (also known as a fiber distribution terminal (FDT)) on each floor, or every few floors, of an MDU. The FDT connects the building riser cable to the horizontal drop cables which run to each living unit on a floor. Drop cables are spliced to the riser cable in the FDT only as service is requested from a tenant in a living unit. These service installations require multiple reentries to the enclosure, putting at risk the security and disruption of service to other tenants on the floor. This process also increases the service provider's capital and operating costs, as this type of connection requires the use of an expensive fusion splice machine and highly skilled labor. Routing and splicing individual drop cables can take an excessive amount of time, delaying the number of subscribers a technician can activate in one day, reducing revenues for the service provider. Alternatively, service providers install home run cabling the full extended length from each living unit in an MDU directly to a fiber distribution hub (FDH) in the building vault, therefore encompassing both the horizontal and riser with a single extended drop cable. This approach creates several challenges, including the necessity of first installing a pathway to manage, protect and hide each of the multiple drop cables. This pathway often includes very large (e.g., 4 inch to 6 inch) pre-fabricated crown molding made of wood or plastic. Many of these pathways, over time, become congested and disorganized, increasing the risk of service disruption due to fiber bends and excessive re-entry.

SUMMARY

According to an exemplary aspect of the present invention, a system for communications access to a drop location comprises a duct having a conduit portion with a bore formed throughout and containing one or more communications lines and a mounting portion to mount the duct to a generally flat surface. The system also includes an access box including a base and a cover, the access box including a mounting section formed in the base, a slack storage section formed in at least one of the base and the cover, and a communications line coupling device mounting area disposed in the base. The mounting section is configured to fit over an outer shape of the duct and overhang therefrom. The slack storage section comprises one or more guides to route an accessed communications line to the coupling device mounting area and to store excess amounts of the accessed communications line. The communications line coupling device mounting area is configured to receive at least one of a coupling, an adapter, and a splice that connects the accessed communications line to a drop cable.

In another aspect of the invention, a system for installing communications access to a drop location in a hallway of a building comprises a duct having a conduit portion with a bore formed throughout and containing one or more communications lines and a mounting portion to mount the duct to a generally flat surface, at least the flange portion including an adhesive disposed thereon, and a duct applicator tool to continuously receive the duct from a storage structure. The applicator tool includes a generally planar frame that supports at least one duct channel that receives the duct and provides a support surface that places a pressing force onto the duct as the duct is applied to the generally flat surface. The applicator tool includes one or more duct guides disposable on at least an end of the frame, where the one or more duct guides guide the duct from its storage structure to the at least one duct channel.

In another aspect of the invention, a method for providing communications lines to the hallway of an existing MDU, MTU, or other similar residential or commercial building comprises installing a duct in the hallway of the building, where the duct includes one of a plurality of loosely packed buffered optical fibers and a ribbon fiber cable disposed in a conduit portion of the duct. At least one optical fiber is accessed from the duct at a first fiber drop location. A first drop access box is installed at the first drop location, where the first drop access box includes a base and a cover. The drop access box includes a mounting section formed in the base, a slack storage section formed in the base, and a communications line coupling device mounting area disposed in the base. The drop access box is mounted onto the duct in an overhanging manner to cover the accessed fiber. The accessed fiber is terminated. The terminated accessed fiber is coupled to a coupling and the coupling is mounted in the communications line coupling device mounting area. The method further includes routing and storing fiber slack from the accessed fiber through the slack storage section of the drop access box.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIG. 4A is a schematic view of an exemplary drop access box with its cover removed according to an aspect of the present invention.

FIG. 4B is an isometric view of an alternative drop access box with its cover removed according to another aspect of the present invention.

FIGS. 15A-15B show different views of an alternative duct applicator tool according to another aspect of the invention.

Figure 1:
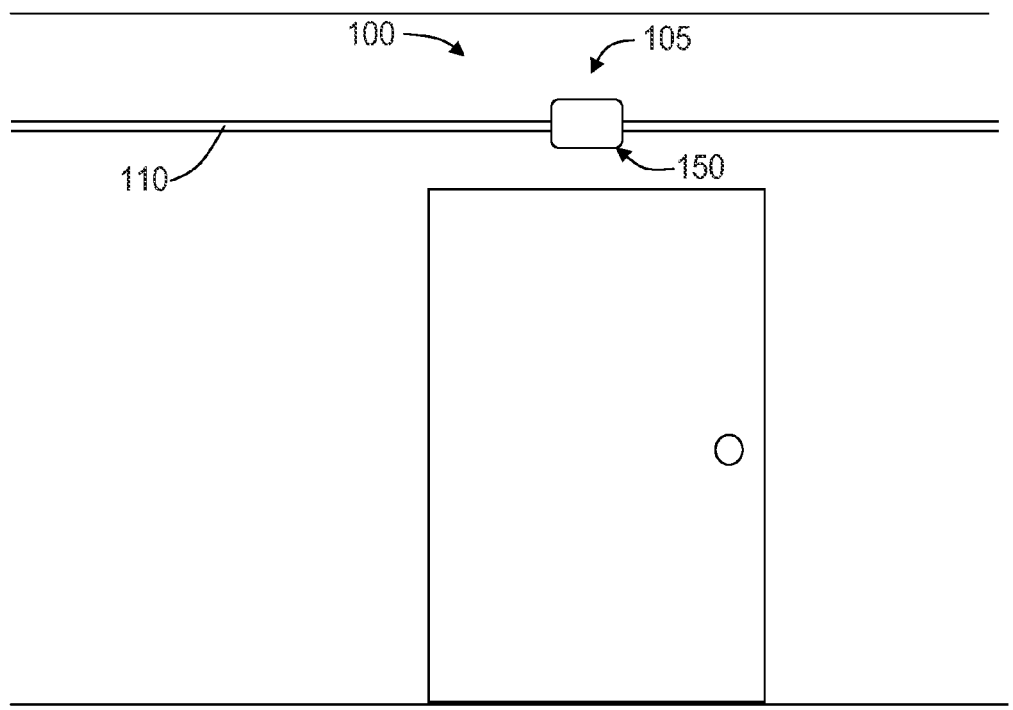
FIG. 1 is a schematic view of a drop access location system according to a first aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention is directed to a drop access point or location installation method and system for use in horizontal cabling applications at an MDU, multiple tenant unit (MTU), or other similar commercial or residential building location. The system 100 provides a pathway for telecommunications wires and access points for dropping individual communication lines to individual living units, such as residences or offices, within the MDU, MTU or other building location. The components of the system are designed with low impact profiles for better aesthetics. With the drop access point method and system described herein, new communications wiring, including optical fiber, copper communications wiring, electrical wiring, or a combination thereof, can be installed on the walls of a corridor or hallway in an existing building. As such, new or improved service can be provided to individual living units, which can be accommodated by quickly connecting short runs of cabling in the living unit to the new communications wiring pre-positioned outside the living unit when the additional communications line is installed.

FIG. 1 shows a schematic view of a first aspect of the present invention, a drop access location system 100. In this example, system 100 is installed in a hallway of an exemplary MDU. System 100 can also be utilized in other indoor and outdoor applications, and in commercial or residential buildings, such as in office buildings, professional suites, hotels, schools, hospitals, and apartment buildings. While reference throughout the description is made to MDUs and/or MTUs for simplicity, this reference is not intended to be limiting, as systems 100, 200 (FIG. 9A) or 200' (FIG. 9B) can be utilized in the other structures identified above.

The fiber drop access point system 100 comprises a conduit or duct 110 which contains one or more communications lines (such as horizontal cables or lines, not shown in FIG. 1) from a telecommunications closet (or other distribution location) to one or more living units. The communications lines can comprise optical fibers, electrical wires, coaxial/microcoaxial cable, or a combination of these, for data, video, and/or telephone signal transmission. In one aspect, the communications lines can comprise discrete (loose) or ribbonized fiber, such as 900 µm buffered fiber(s) or other standard size communications fiber. In addition, although the exemplary aspects described herein are often specific to accessing optical fiber lines, it would be understood by one of ordinary skill in the art given the present description that the drop access location system can be configured to accommodate copper communication wiring, electrical wire drops and/or hybrid combination drops as well.

Figure 3:
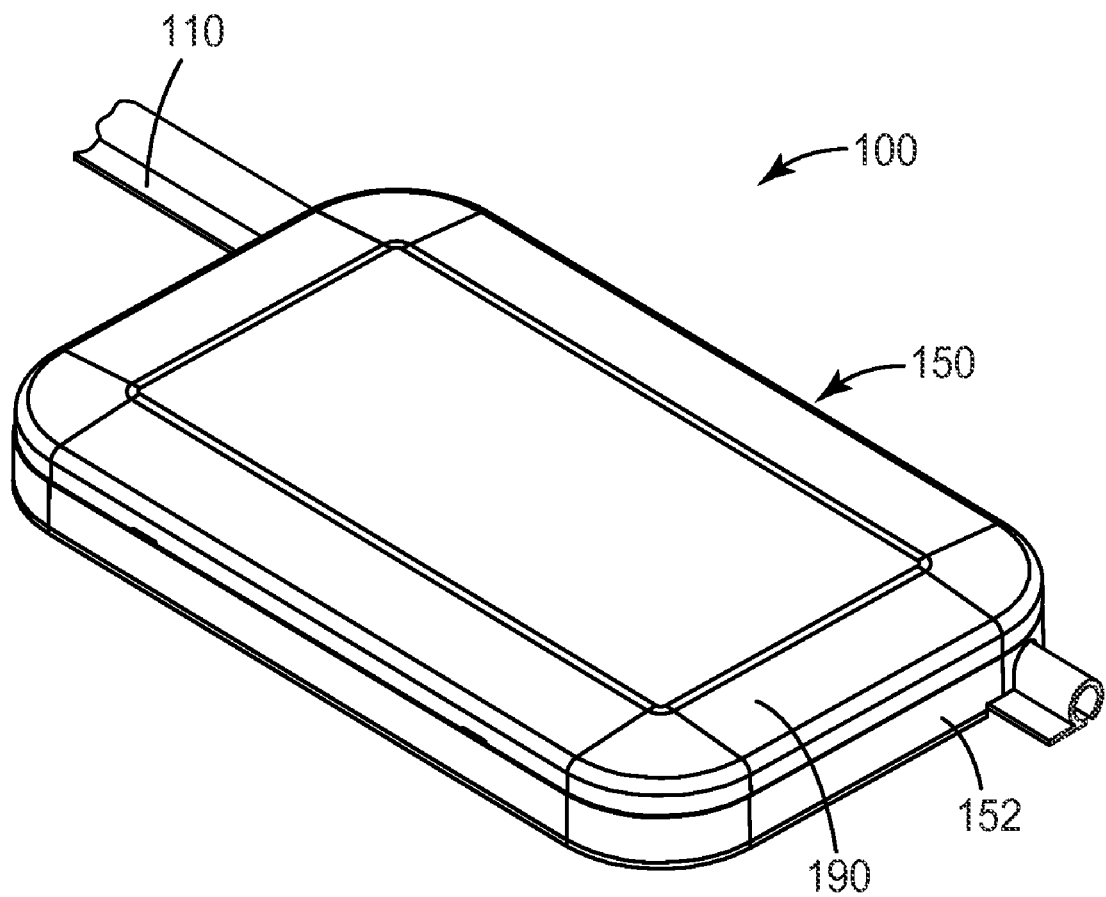
FIG. 3 is an isometric view of an exemplary drop access box according to an aspect of the present invention.

System 100 further comprises one or more access boxes 150 that are located at one or more access points 105, such as at or near the entryway of a living unit. As shown in further close-up view in FIG. 3, drop access box 150 includes a base portion 152 and a cover 190. The base portion 152 and cover 190 can be formed from a rigid plastic material or metal. The access box 150 (cover and base) can have a low profile and/or decorative outer design (such as a wall sconce, rosette, interlaced knot, mission square, shell, leaf, or streamlined industrial design), and the access box can be color-matched to the general area of the installation, so that the box does not detract from the aesthetic appeal of the location where it is installed. The drop access box can also be provided with lighting devices for illumination. Further, the cover may further include a decorative overlay film laminated to the outer surface(s). Such a film can comprise a 3M™ Di Noc self-adhesive laminate (available from 3M Company), and can resemble wood grain or metallic surfaces of the surrounding architecture.

The cover 190 provides protection for the contents of the access box when installed. The cover 190 can be removably mounted onto the base 152 of the drop access box 150 via a snug interference fit, with a small seam. Alternatively, the cover can be mounted via a conventional latch feature or the cover can be hingedly coupled or tethered to the base portion 152 of access box 150. In a preferred aspect, the cover snugly fits onto the base portion 152 of the access box via an interference fit. The cover may also include a sealing gasket or an overlapping portion to reduce the risk of the intrusion of dirt, dust, water, or other elements. In another aspect, the cover 190 may be further secured to the base 152 via a locking mechanism.

While the box and cover of the exemplary aspects comprise a generally rectangular shape, the access box 150 can comprise other shapes as well, such as a flattened circular pedestal or a rectangle/square with rounded corners, beveled edges, ribbed and/or slotted sides. Also, the drop access box can have a square shape to resemble an electrical junction box, switch, face plate, or lighting fixture, such as a wall sconce. In addition, cover 190 can include a hanger tab 167 (see FIG. 5) used to temporarily hold the cover to the base during installation.

Figure 6:
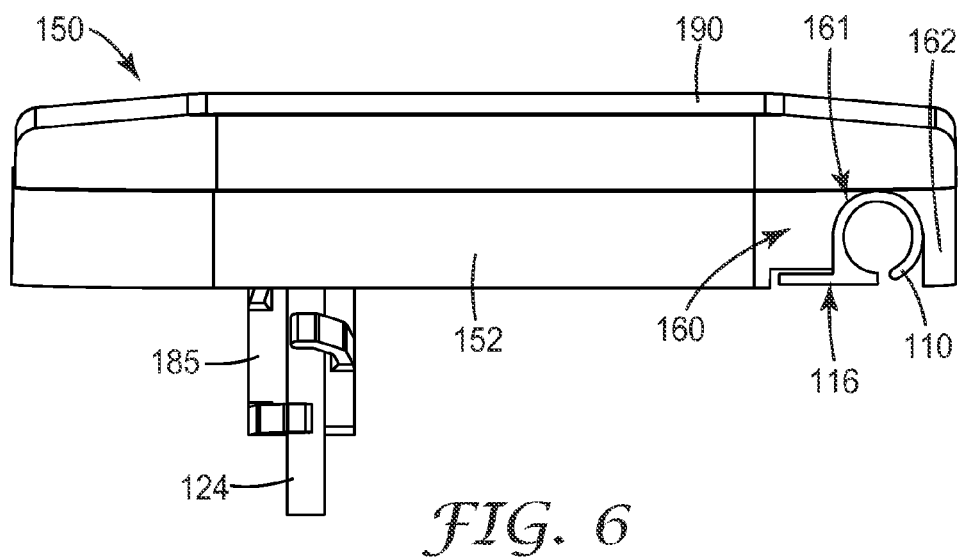
FIG. 6 is a side view of an exemplary drop access box according to an aspect of the present invention.

In addition, the base can be designed to latch other covers of different decorative design and shape. Further, as shown in FIG. 6, the depth of the access box 150 when covered with cover 190 is relatively small to provide a low profile. For example, in one aspect, the access box 150, when covered with cover 190, can have a depth of from about 0.25 inches to about 1.5 inches, preferably about 1.0 inch. In one aspect, the access box can have a length of from about 4 inches to about 8 inches and a width of from about 2 inches to about 5 inches. If decorative features are attached to the cover, the volume occupied by the access box with the decorative feature can be much greater.

Figure 2:
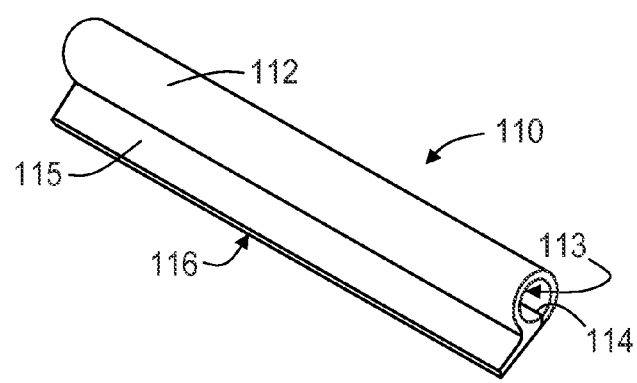
FIG. 2 is an isometric view of an exemplary flexible duct.

In more detail, a close-up isometric view of exemplary duct 110 is shown in FIG. 2. In this example, duct 110 includes a conduit portion 112 having a bore 113 provided therethrough. The bore is sized to accommodate one or more communications lines disposed therein. In a preferred aspect, in use, the duct 110 comprises a plurality of communications lines, such as a fiber ribbon cable. In use, the duct 110 can be pre-populated with one or more communications lines. In addition, duct 110 may also be populated with at least one electrical power line.

While conduit portion 112 can have a generally circular cross-section, in alternative embodiments it may have another shape, such as a rectangle, square, triangle, oval, or other polygonal shaped cross-section.

In one aspect, duct 110 is a structure formed from a polymeric material such as polyvinyl chloride (PVC), making it flexible, flame retardant and robust. As such, duct 110 can be guided and bent around corners and other structures without cracking or splitting. Duct 110 can be continuously formed using a conventional extrusion process.

In addition, in some aspects, duct 110 can further include a slit 114 that runs the longitudinal length of the duct. Slit 114 can provide access for inserting or removing the fiber. In the embodiment of FIG. 2, slit 114 is positioned at the base of the generally circular conduit portion 112. However, in alternative embodiments the slit may be positioned at a different position (e.g., top or middle) on the conduit portion 112. In an alternative aspect, the slit can be within overlapping wall surfaces of the conduit to ensure the communications lines are properly restrained within the conduit portion. This structure can further promote a more aesthetically pleasing duct. This alternative slit can be opened by the installer to access the communications lines within the conduit portion. In a further alternative, duct 110 can include multiple longitudinal slits for access or separation of services (e.g., for use with a divided conduit). In one example, the slit can be sealed (using a conventional heat or laser welding technique) during the manufacturing process after population of the conduit portion with communications lines. Accordingly, the duct 110 can be provided to the installer without a slit.

Duct 110 also includes a mounting portion 115 or similar flattened portion to provide support for the duct 110 as it is installed on or fastened to a wall or other generally flat surface, such as a wall, floor, ceiling, or molding. In one aspect, the mounting portion 115 is provided as a flange. Such a flange can extend along the longitudinal axis of the duct as shown in FIG. 2. While the exemplary duct includes a single mounting portion, such as flange 115 positioned (in use) below the conduit portion, in an alternative aspects, the mounting portion or flange can be centrally located adjacent the conduit portion. In a further alternative, duct 110 can include a second flange portion for added surface area support. Moreover, the flange 115 can be formed as a sawtooth shape (not shown) to permit in-plane bends along walls or other flat surfaces. In alternative applications, a portion of the flange can be removed for in-plane and out-of-plane bending.

In a preferred aspect, the flange 115 includes a rear surface 116 that has a generally flat surface shape. This flat surface provides a suitable surface area for adhering the duct 110 to a mounting surface, a wall or other surface (e.g., a dry wall, concrete, or other conventional building material) using an adhesive, such as an epoxy, transfer adhesive or double-sided tape. In one alternative aspect, flange surface 116 comprises an adhesive-lined surface with a removable liner. In use, the liner can be removed and the surface 116 can be applied to a mounting surface. In another aspect, the adhesive can be disposed on more than one surface of the flange. In alternative aspects, other fastening techniques (e.g., nails, staples, mounting brackets, etc.) can be utilized. Also, as the exemplary duct 110 is flexible, it can be adhered to modestly curved surfaces as well.

Figure 5:
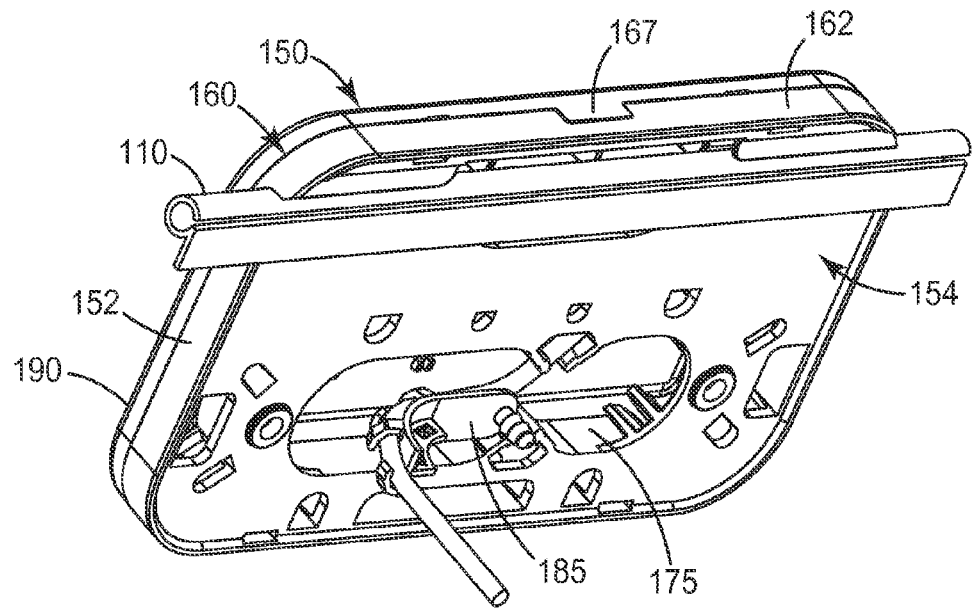
FIG. 5 is an isometric view from the back side of an exemplary drop access box according to an aspect of the present invention.
Figure 8A:
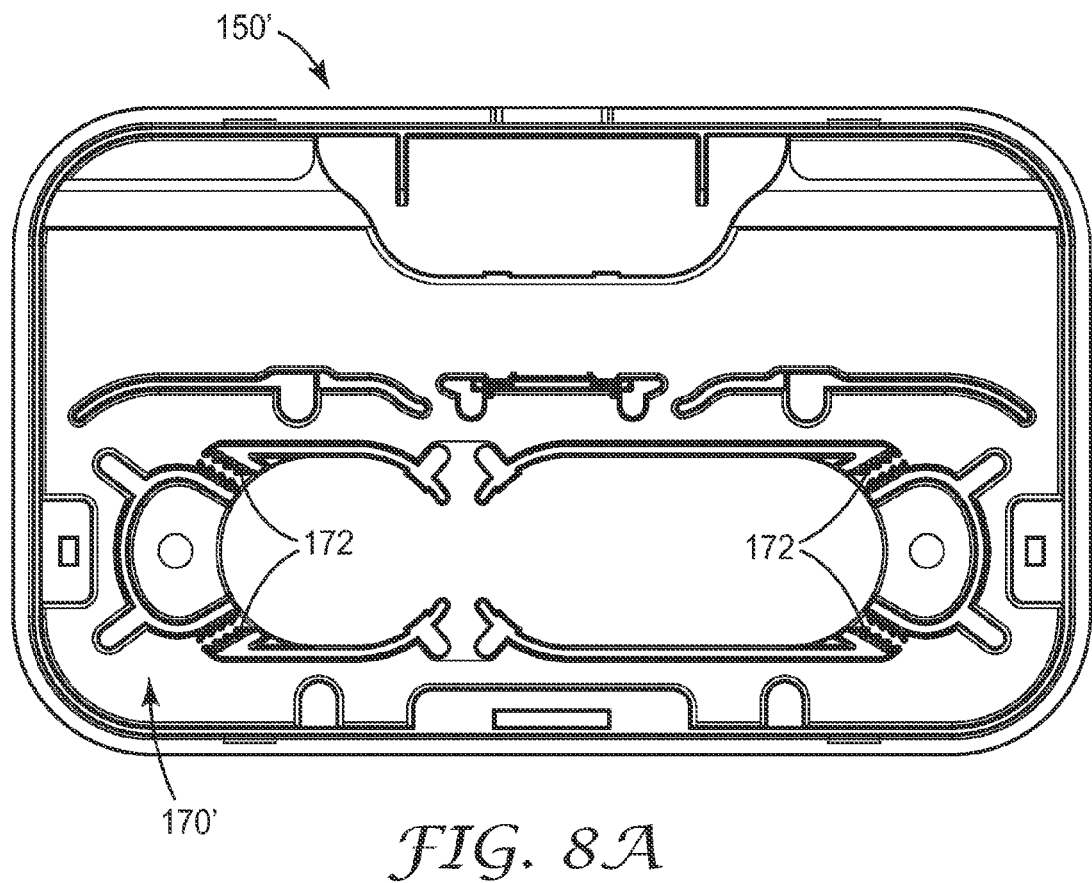
FIGS. 8A-8C show views of an alternative drop access box according to an aspect of the present invention.
Figure 8B:
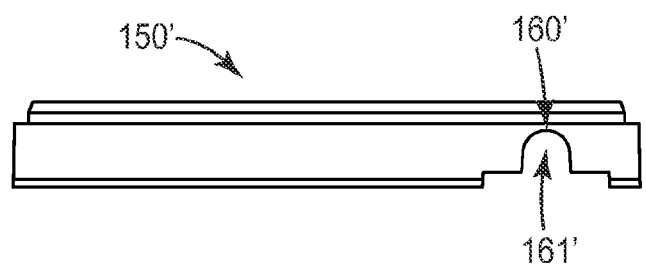
Figure 8C:
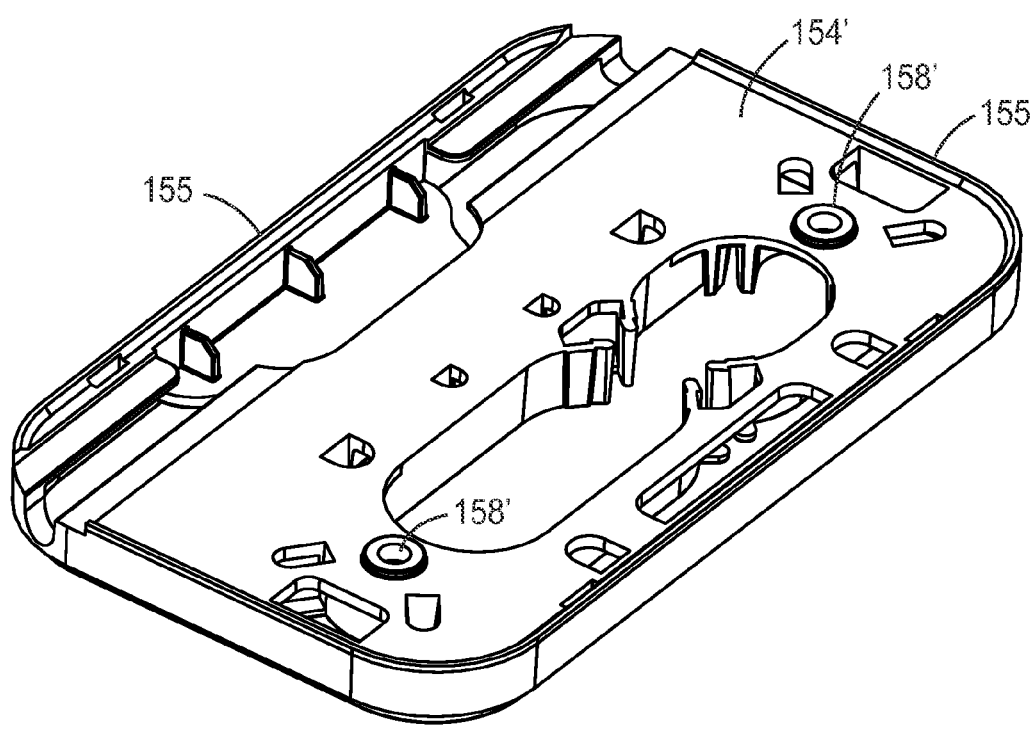

In further detail, FIGS. 4A, 5, and 6 show different views of exemplary drop access box 150, where FIG. 4B shows a view of an alternative drop box 150", and where FIGS. 8A-8C show a further alternative access box 150'. Elements described with respect to access box 150 can also be included in alternative access boxes 150' and 150", as would be understood by one of ordinary skill in the art given the present description.

Box 150 includes a mounting section 160 that provides for straightforward mounting of the box 150 onto the duct 110. Mounting section 160 is configured to fit onto and over duct 110. In this manner, box 150 can be mounted to duct 110 after the duct (and the communication lines therein) are already installed. For example, as shown in FIGS. 5 and 6, mounting section 160 includes a cut-out portion 161 configured to fit over the outer shape of duct 110. As such, outer wall portion 162 overhangs duct 110 and can support access box 150 during installation. In addition, the configuration of mounting section 160 allows for box 150 to be mounted onto duct 110 at nearly any location along the duct path. This configuration allows a through hole to be drilled through the hallway wall into the living unit at a later time. In addition, this system configuration allows for multiple possible access box locations, including above door locations or at lower height locations in the hallway of the MDU.

FIG. 4A shows the interior region of access box 150. In this region, one or more communications lines disposed within duct 110 can be accessed and connected to one or more drop wires or drop fibers of a particular living unit. In this particular exemplary aspect, a fiber 122 from duct 110 can be coupled to drop fiber cable 124 from a particular living unit.

In another aspect, more than one fiber from the duct can be accessed at this location. The communication fiber(s) 122 can be accessed either through a separate window cut made to the conduit portion 112 of the duct or through the slit 114 already formed in duct 110, depending on the particular configuration of the duct.

In one aspect, access box 150 can accommodate one or more coupling devices, such as optical splices, couplings or adapters for connecting standard optical connectors. In this example, the mounting section 160 can further include a support portion or overhanging bridge 164 that can add strength to the mounting section and provide additional protection to any exposed fiber(s) from the duct. In addition, the overhanging bridge support 164 can also include one or more splice holders 176 configured to accommodate a fusion and/or mechanical splice. The base section 152 of the access box 150 can also include a coupling mounting area 178 that includes one or more adapter or coupling slots, brackets and/or leaf springs to receive an optical fiber connector adapter or coupling 180 of one or several different types. In an alternative aspect, the splice holders and the coupling mounting area 178 can be placed in a different area of the access box. In a further alternative, the cover 190 can be configured to include a coupling mounting area.

In a further alternative for access box 150', such as shown in FIG. 4B, the overhanging bridge support can be removed and one or more splices may be held in a splice holder section 176' formed at or near the coupling mounting area 178. In addition, one or more splices may be held in a splice holder section 179' positioned at or near tab 192 formed in the slack storage section 170 of the base 152.

The access box 150 can further include a fiber slack storage section 170 to route the accessed fiber. In this example, fiber 122 can be routed (either from the left hand side or right hand side of the mounting section) along one or more fiber guides 171. The fiber is protected from over-bending by bend radius control structures 173 formed in or on the base 152 in the fiber slack storage section. The fiber slack storage section 170 can include both long and short fiber loop storage structures, such as shown in FIG. 4A. In addition, the coupling/adapter orientation can be independent of the service fiber entry point. Also, the wrap direction of the fiber can be reversed using a cross-over section provided in the fiber slack storage section 170 for consistency in mounting configuration of the connectors used within the access box. The fiber slack storage section 170 can also include one or more gripping structures or teeth 172 (see FIGS. 4B and 8A) formed on or as part of the fiber guides and/or bend radius control structures to further grip the jacket portion of the cables being stored therein. In the example of FIG. 4A, up to 50 feet of 900 μm buffered fiber and up to three feet of 3 mm fiber slack can be stored in access box 150. In an alternative aspect, the cover 190 can also accommodate slack storage.

In one aspect, fiber 122 comprises a tight bend radius, 900 μm buffered optical fiber. Such an optical fiber cable is commercially available as BendBright XS™ Single Mode Optical Fiber, from Draka Communications. Also in this aspect, drop cable 124 can comprise a 2.9 mm jacketed drop cable commercially available as ezPatch™ cabling and ezDrop™ cabling from Draka Communications.

The fiber 122 can be guided to the splice holders 176 or the mounting area of the coupling 180 depending on the type of coupling to be utilized in connecting to the drop fiber cable. The coupling 180 may be provided in the access box or it may be supplied by the installer and mounted in the coupling mounting area. The coupling 180 can comprise a conventional in-line optical fiber coupler or adapter.

In the example of FIG. 4A, fiber 122 is field terminated with an optical fiber connector 182. For example, connector 182 can comprise an optical fiber connector that includes a pre-polished fiber stub disposed in ferrule that is spliced to a field fiber with a mechanical splice, such as described in U.S. Pat. No. 7,369,738. The fiber 122 can be coupled to a drop cable 124 having a connector 184, such as a conventional SC connector, via coupling or adapter 180. Other conventional connectors can be utilized for connectors 182 and 184, as would be apparent to one of ordinary skill in the art given the present description.

This exemplary design provides for the placement of splices and/or connectors within the access box 150 without the need for additional splice trays, inserts, or extra components. Further, connector coupling can be removed independently (e.g., to connect/disconnect fibers/wires) without disturbing the slack storage area. Moreover, all connections can be housed entirely inside the access box 150, increasing installation efficiency and cabling protection.

The drop cable 124 can be a conventional fiber cable such as a 2.9 mm jacketed fiber cable (e.g., an ezDrop Cable, available from Draka Communications) or blown fiber cabling (containing multiple discrete buffered fibers). The drop cable can be run in either direction (i.e., to or from the access box 150), and can (or not) be pre-connectorized at one or two ends (e.g., a pre-connectorized pigtail of 3 mm jacket cable). In one aspect, the drop cable can also be routed within access box 150 via guides 171 and bend radius control structures 173. The drop cable 124 extends into an individual living unit through an opening 175 formed in base 152. The opening 175 corresponds in location with a hole bored or drilled in the wall outside of the individual living unit. In addition, the opening 175 can be much larger than the hole drilled into the wall to the living unit so that less precision is required and in order to accommodate potential barriers within the wall (e.g., studs, pre-existing wiring, etc.).

Figure 7:
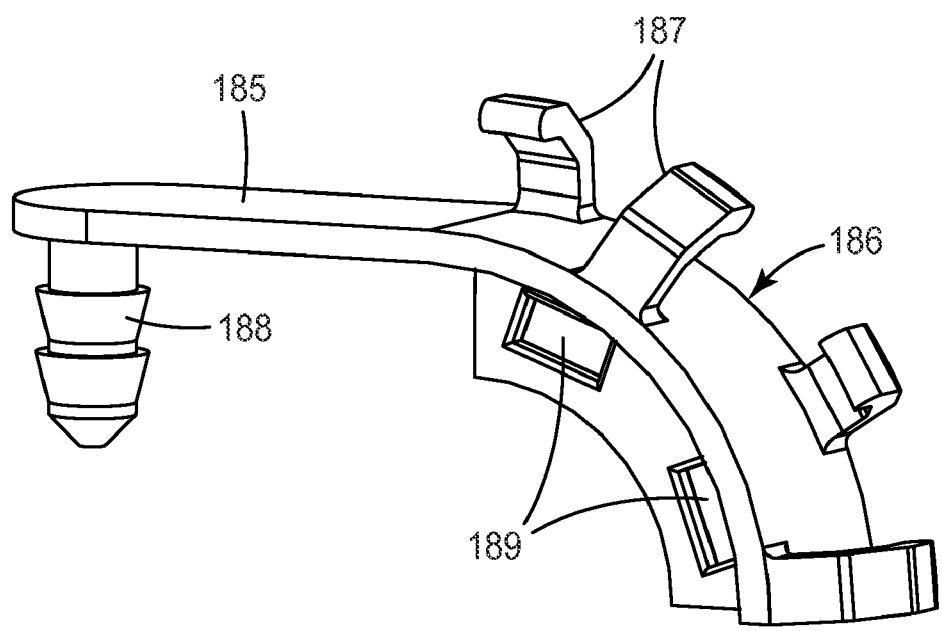
FIG. 7 is an isometric view of a radius control anchor according to another aspect of the present invention.

To provide further support and bend control for the drop cable 124, access box 150 can include (as a separate component) a bend radius control anchor 185 (see FIG. 7). The anchor 185 can grip a portion of drop cable 124 using one or more griping clips 187. The anchor 185 can also include slots 189 to accommodate zip-ties for fiber anchoring, to reduce the risk of over-bending and/or fiber pull out. In addition, the drop cable 124 can be protected from overbending as the anchor 185 includes a curved region 186, whose curvature is configured not to exceed the minimum bend radius of the drop cable. Optionally, the anchor 185 can be securely mounted onto the wall using an anchoring post 188. Alternatively, the post 188 can be omitted and the anchor can be mounted to the access wall via an adhesive or fastener. As shown in FIG. 5, the anchor 185 can guide the drop cable from the box 150 through the hole or bore drilled into the living unit. The drop fiber cable can be terminated on the other end at an optical network terminal (ONT), such as a single family unit optical network terminal (SFU ONT) or wall box (e.g., a 7342 Indoor Optical Terminal, available from Alcatel-Lucent), such as ONT 205 shown in FIG. 10. Excess drop cable can be stored in the slack storage section 170 of the access box. As shown in FIG. 6, anchor 185 extends into the access wall, helping reduce the profile of the access box 150, while maintaining proper bend radius for the drop cable.

In an alternative aspect, such as shown in FIG. 4B, the drop cable 124 can enter or exit the access box 150" via a strain relief channel 193 formed as an integral portion of the base 152. A cable tie (not shown) or similar fastening device can be utilized to secure the drop cable 124 to the strain relief cable channel 193.

As mentioned above, the access box 150 can house one or more connector couplings for standard format optical connectors. Also, access box 150 can be used to house one or more optical splitters, such as a planar lightguide circuit (PLC) optical splitter or a fused biconic taper (FBT) optical splitter. In addition to the coupling, routing and splicing components described above, access box 150 can be configured to hold other types of components and/or equipment, such as a security camera, alarm, fire detection/protection equipment, entrance key, a door bell, RFID card reader, and/or a battery or batteries.

The access box 150 further includes a rear surface 154 that can be placed flush against a wall, floor, or ceiling. In one aspect, access box 150 can be finally secured to a wall, floor, or ceiling via an adhesive, such as an epoxy. Alternatively, access box 150 can be finally secured to a wall, floor, or ceiling via a conventional fastener such as a screw, that mounts the box onto the wall via designated locations 158 located in the base 152 (see FIG. 4A).

In addition, the access box 150 can include slot 159 formed on a tab that allows an installer to secure the cover 190 to the box 150 (e.g. by hanging the cover from the access box) during installation when the interior of the box is accessed. Moreover, cover 190 can include one or more mounting slots, snap features, or brackets for storage of components, e.g., adapters, when not in use.

In another aspect, an alternative access box 150' is shown in FIGS. 8A-8C. While many of the features of access box 150' are similar to those of access box 150, the access box 150' can include several additional features (the cover is not shown for simplicity). For example, as shown in FIG. 8A, the fiber slack storage section 170', which can route the accessed fiber, can include one or more sets of teeth 172. These teeth 172 are configured to provide further strain relief. In this aspect, one or more of sets of teeth 172 can receive the cable that connects the adapter or coupler in the box 150' (such as adapter or coupler 180 shown in FIG. 4A) to the SFU ONT in the living unit. The teeth can grip the jacketing of the cable and reduce the risk of inadvertent disconnection. For example, the teeth provide an anchor for the cabling and can indicate to an installer winding the cable at the FDT that no more cable slack remains.

In addition, as is shown in FIG. 8B, drop access box 150' can include a mounting section 160' that provides for straightforward mounting of the box 150' onto a duct mounted with either a flange-side up or a flange-side down. In this manner, for example, cut-out portion 161' is configured to fit over the outer shape of duct 110 regardless of the duct's orientation. As mentioned previously, while the exemplary duct includes a mounting surface formed as a single flange positioned (in use) below the conduit portion, in an alternative aspects, the flange can be centrally located adjacent the conduit portion. In a further alternative, the duct can include a second flange portion for added surface area support.

Also, as is shown in FIG. 8C, drop access box 150' can include a rear surface 154' that includes a raised border ledge 155. The raised border ledge can allow the box to maintain a flat appearance (when viewed from, e.g., the hallway of the MDU) by raising the main rear surface of the box 150' off of the mounting wall or surface, which may have one or more surface irregularities. In addition, the rear surface 154' can include raised bosses 158' which are located at the screw/fastening locations.

In another aspect, a drop access location system 100 configured to accommodate horizontal cabling can be installed in the hallway or passageway of an MDU in the following manner. In this example, the duct that is utilized is shaped similar to duct 110 described above and the access box that is utilized is configured similar to access box 150 described above. This exemplary duct can be extruded at the factory and the back surface of the flange can be fitted with an adhesive tape with a removable liner. In addition, the duct can be pre-populated with a plurality of loosely packed 900 μm buffered fibers disposed in the conduit portion. The duct can be housed on a spool for delivery and storage prior to mounting.

The duct is mounted to a wall of an MDU hallway by removing the adhesive liner and placing and pressing the duct to the wall at a pre-selected height above the doorways of the living units. Alternatively, the duct can be mounted at a different height, for example, along the base board of the hallway. The entire perimeter of the hallway can be installed with the duct at this initial stage. In addition, it is preferred to keep an excess amount of duct available beyond the anticipated position of the furthest access box location to accommodate a suitable amount of slack for the service fiber for the furthest living unit. Locations for access box mounting can be marked. An exemplary tool and system for installing the duct is described in more detail below.

Optionally, a first access box can be installed at a first drop location, preferably the drop access box is installed at a location furthest downstream from the telecommunications cabinet. The access boxes can be installed one at a time or the entire hallway can be populated with drop access boxes during a single installation.

A window cut can be made to an outer surface of the conduit portion of the duct to expose one or more of the fibers to be coupled to the fiber drop at that drop location. In one aspect, a template can be utilized by the installer to ensure a proper length and/or depth for the window cut. The desired service fiber for that location can be cut at location downstream from the access box then pulled back to the mounting location. The desired service fiber or fibers can be removed from the duct via the window cut or, alternatively, the duct slit. The access box can be mounted onto the duct in an overhanging manner to cover the exposed portion of the duct, in a manner similar to that described above.

The desired fiber can then be spliced or otherwise terminated. In a preferred aspect, the desired fiber is field terminated using a procedure in accordance with that described in U.S. Pat. No. 7,369,738. For example, an SC-format NPC connector (available from 3M Company (St. Paul, Minn.)) can be utilized. Alternatively, the fiber can be terminated by a commercially available fused-on connector or fusion splicing a pigtail. In this manner, the fiber is terminated with a connector having a standard connector format. The fiber slack can then be routed through the slack storage section of the access box. The connector end of the terminated fiber can then be received in a coupling or adapter that is provided and mounted in the coupling device mounting area within the drop access box. Thus, the terminated fiber is "parked" in the access box awaiting a subscriber to call for service. If a fusion or mechanical splice is to be used, termination and connection can be delayed until the time of subscription.

If a subscriber is present at the mounted access box location, a through hole can be drilled into the wall, where the through hole location would be covered by the access box. The drop cable can be fed through the wall from the access box into the living unit using a bend control anchor affixed to the wall, such as anchor 185 described above, and routed through the slack storage section of the access box. A connection can be made to the terminated service fiber by plugging the connectorized drop cable (e.g., field terminated, preterminated or a connector on a pigtail fiber) into the coupling or adapter.

As mentioned above, prior to a service connection or hookup at the first drop location, each of the other drop access boxes can be mounted in accordance with the procedures described herein so that all drop access boxes are populated with service fiber. In this aspect, each successive service fiber can be identified and cut at a downstream access box location and terminated as described above. Thus, each access box can include a "parked" service fiber awaiting hookup upon subscription. Also, the terminated service fiber can be tested to qualify the line and ensure that service is ready for a subscribing customer.

Figure 10:
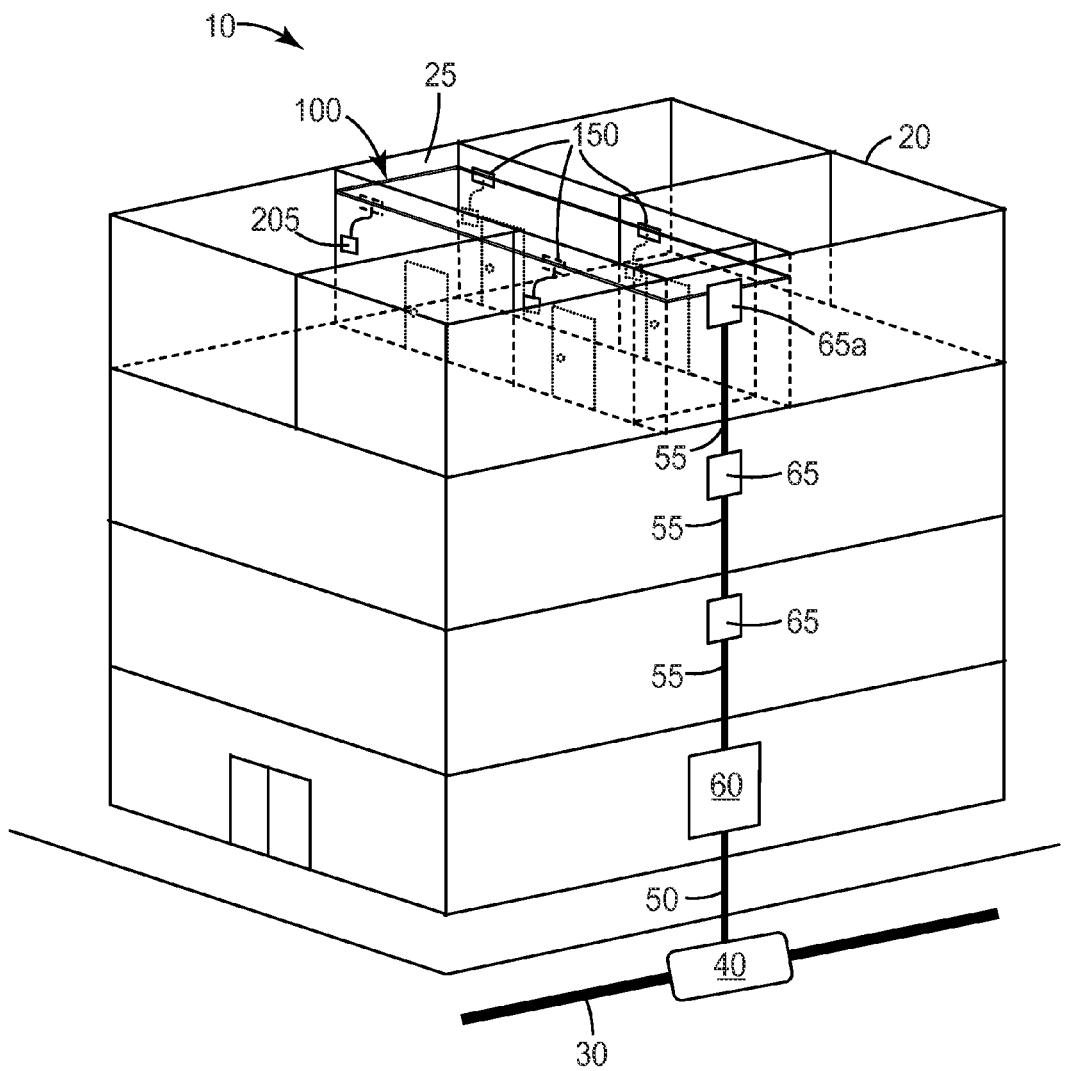
FIG. 10 shows a schematic view of an exemplary MDU having a drop access location system according to an aspect of the present invention installed therein.

As mentioned above, the drop access point or location installation method and system can be used for cabling applications at an MDU or other location. FIG. 10 shows an example MDU 10 that can accommodate any of the drop access systems described herein. MDU 10 is a multi-floor structure having a plurality of living units located therein. One example floor 20 has four living units having a common hallway 25. Feeder cable 30 brings communications lines to and from building 10. These feeder lines are spliced to the MDU's cabling at a splice closure 40. The building feeder lines 50 are distributed to the building from a fiber distribution hub (FDH) 60. Each floor includes a fiber distribution terminal (FDT) 65 that receives communications lines via riser cable 55. In the present example, a drop access system 100 coupling the communications lines from FDT 65*a* can be installed on hallway 25 such as is described above, where drop access boxes 150 can be disposed at each living unit.

As is also mentioned above, the drop access location system can be configured to accommodate copper communication wiring, electrical wire drops and/or hybrid combination drops as well. In alternative aspects, the drop access location system can be configured to supply at least one of uninterrupted DC power and AC power to an optical network terminal located in an individual living unit at the drop location.

Figure 9A:
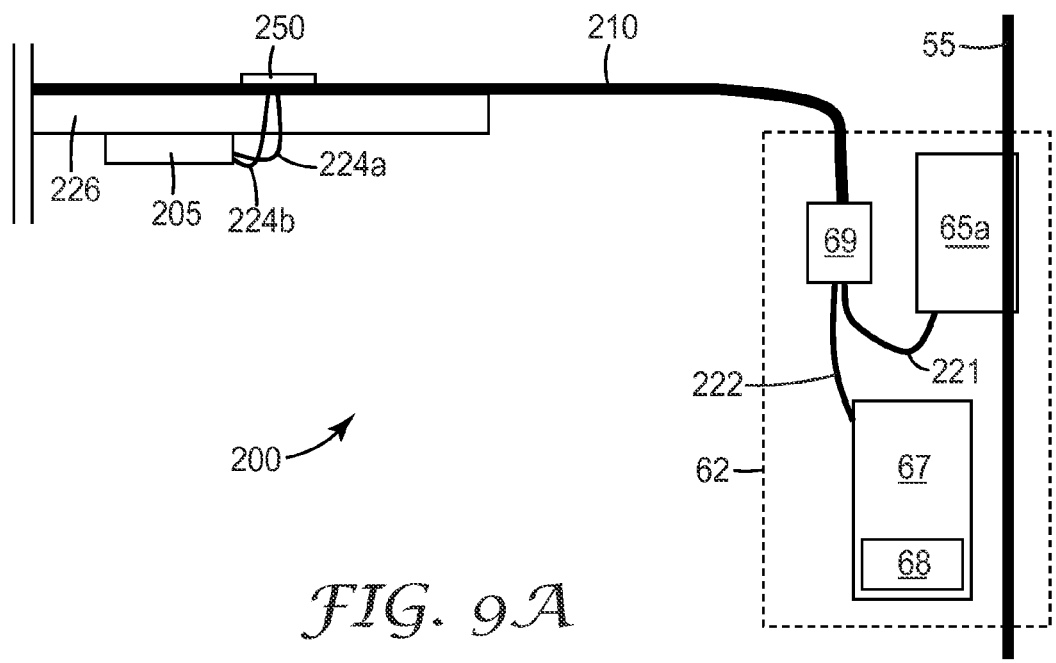
FIG. 9A shows a schematic view of a drop access location system according to another aspect of the present invention.
Figure 9B:
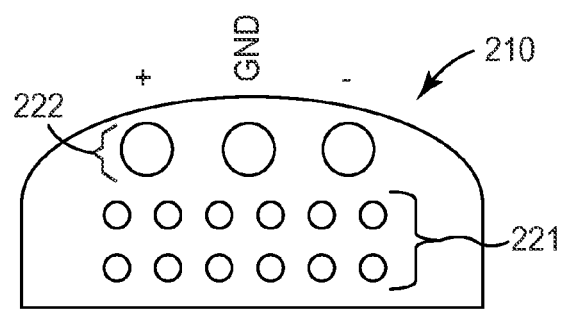
FIG. 9B shows a cross-section view of a hybrid cable according to another aspect of the present invention.
Figure 9C:
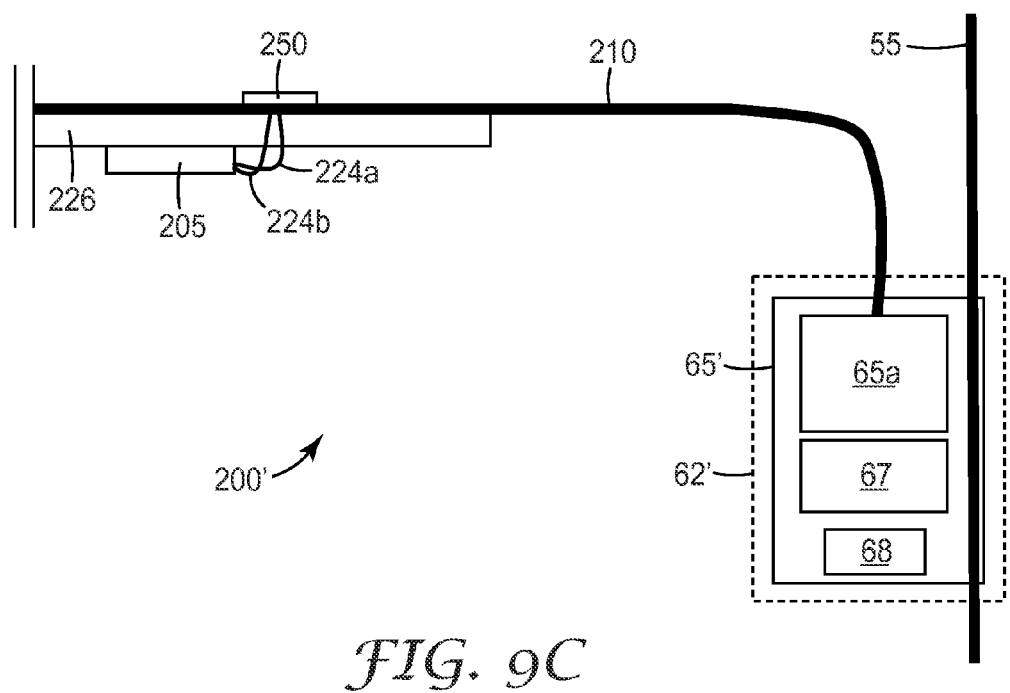
FIG. 9C shows a schematic view of a drop access location system according to yet another aspect of the present invention.

In one preferred aspect, FIG. 9A shows a first alternative drop access system 200 that accommodates a hybrid combination drop for providing communications and power service, including uninterrupted power service, to an individual customer. FIG. 9C shows a second alternative drop access system 200'. In these examples, the hybrid systems can be used to supply battery back-up power to the communications equipment of an individual living unit in the event of a power outage or other emergency situation.

In more detail, drop access system 200 includes a conduit or duct 210 which contains one or more communications lines (such as ribbon/discrete fibers 221 shown in FIG. 9B) and one or more power lines (such as electrical wires 222 shown in FIG. 9B) that originate from a telecommunications closet 62 and extend to the living units accessed by the hallway 25 of the MDU. Duct 210 can include a flange or similar flattened portion to provide support for the duct 210 as it is installed on or fastened to a wall or other generally flat surface of hallway 25.

Duct 210 can also include a conduit portion having a bore provided therethrough in a manner similar to that described above with respect to duct 110. The bore is sized to accommodate the communications lines and power lines disposed therein. The conduit portion can have a generally circular cross-section or a more flattened shape in cross section, such as is shown in FIG. 9B. Alternatively, the duct 210 may include a conduit portion having another shape, such as a rectangle, square, triangle, oval, or other polygonal shaped cross-section. The duct may be formed from a polymeric material such as polyvinyl chloride (PVC), making it flexible, flame retardant and robust. In addition, duct 210 can further include a slit that runs the longitudinal length of the duct to provide access for inserting or removing the cable(s) and/or fiber(s) therein.

Figure 12:
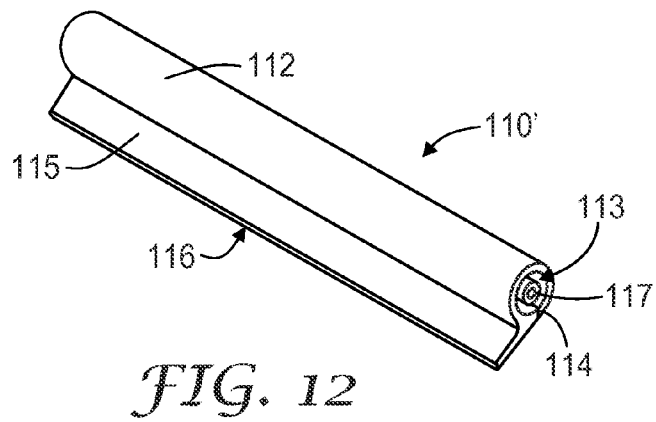
FIG. 12 shows an isometric view of an alternative flexible duct according to another aspect of the invention.

In another aspect, such as shown in FIG. 12, duct 110' can include an inner tube 117 positioned within the bore 113 of the conduit portion 112 of the duct that can provide an additional conduit to feed or blow at least one additional fiber within the tube. The flange 115, slit 114, and surface 116 can be formed in the same manner as described above. As such, the inner tube can provide service to at least one additional living unit or to replace a damaged fiber. For example, the inner tube 117 can allow a technician to insert or fish an additional communication line to a living unit without having to re-install the duct. Furthermore, the fiber installed in the inner tube 117 may be spliced or connected to one of a spare, currently unused fiber going forward from a fiber that was dropped to provide service to a prior living unit, to provide service to additional forward living units, or to recover a damaged fiber. The tube 117 may be formed separately or as part of the duct 110'.

System 200 further comprises one or more access boxes 250' that are located at one or more access points, such as at or near the entryway of a living unit. These drop access boxes can be designed in the same manner as drop access box 150, described above, to accommodate couplings to the accessed communications lines and power lines.

The communications closet 62 includes a FDT 65*a* and an un-interrupted power supply (or UPS) 67. UPS 67 includes or is connected with a rechargeable battery 68. In a preferred aspect, when fully charged, battery 68 can supply at least eight (8) hours of battery backup power for each living unit on that floor. The communications lines 221 originating from FDT 65*a* and the power lines 222 originating from UPS 67 can be joined and mechanically secured at an optional combiner box 69. In normal operation, the UPS supplies DC power along lines 222. The battery 68 can supply DC power to lines 222 in the event that the UPS 67 loses its regular power during an outage or the like.

As with the previous embodiments, lines for an individual living unit can be fed into the living unit via drop access box 250 that is mounted on a hallway-side surface of wall 226. For example, the communication fiber(s) 221 can be accessed either through a separate window cut made to the conduit portion of the duct or through the slit already formed in duct 210, depending on the particular configuration of the duct. If a subscriber is present at the mounted access box location, a through hole can be drilled into the wall, 226 where the through hole location would be covered on the hallway-side by the access box 250.

The desired service fiber or fibers can be removed from the duct via the window cut or, alternatively, the duct slit. The desired communications fiber can then be spliced or otherwise terminated as is described above. In addition, the power lines 222 can be tapped using a conventional in-line splice connector or the like to bring the emergency backup power into the living unit, while allowing the power lines to be accessed at other drop locations in the hallway. The fiber slack can then be routed through the slack storage section of the access box and the electrical splices can be housed in box 250.

A fiber drop cable 224*a* and the power tap line(s) 224*b* can be fed through the wall 226 from the access box 250 into an optical network terminal (ONT) 205 installed on the living unit side of wall 226. ONT 205 can be configured as a conventional ONT. With this approach, a separate back-up battery is not needed to be installed at the ONT 205. As such, each ONT on floor 20 can be provided with uninterrupted power from a central location.

In another aspect, FIG. 9C shows an alternative drop access system 200'. In this alternative embodiment, the communications closet 62' houses a fully integrated unit 65' that includes an FDT 65a, a UPS 67 and a rechargeable battery 68. The remaining components of the drop access system 200' can be similar to those components that are described above with respect to FIGS. 9A and 9B.

In another alternative aspect, an optical fiber damaged within duct 110, 110', 210 downstream of a first fiber dropped to a first living unit can be recovered by splicing or otherwise connecting the working portion of the damaged fiber upstream from the FDT (e.g., FDT 65a) to the good spare dead fiber of the first fiber going forward or downstream toward additional living units.

Figure 11A:
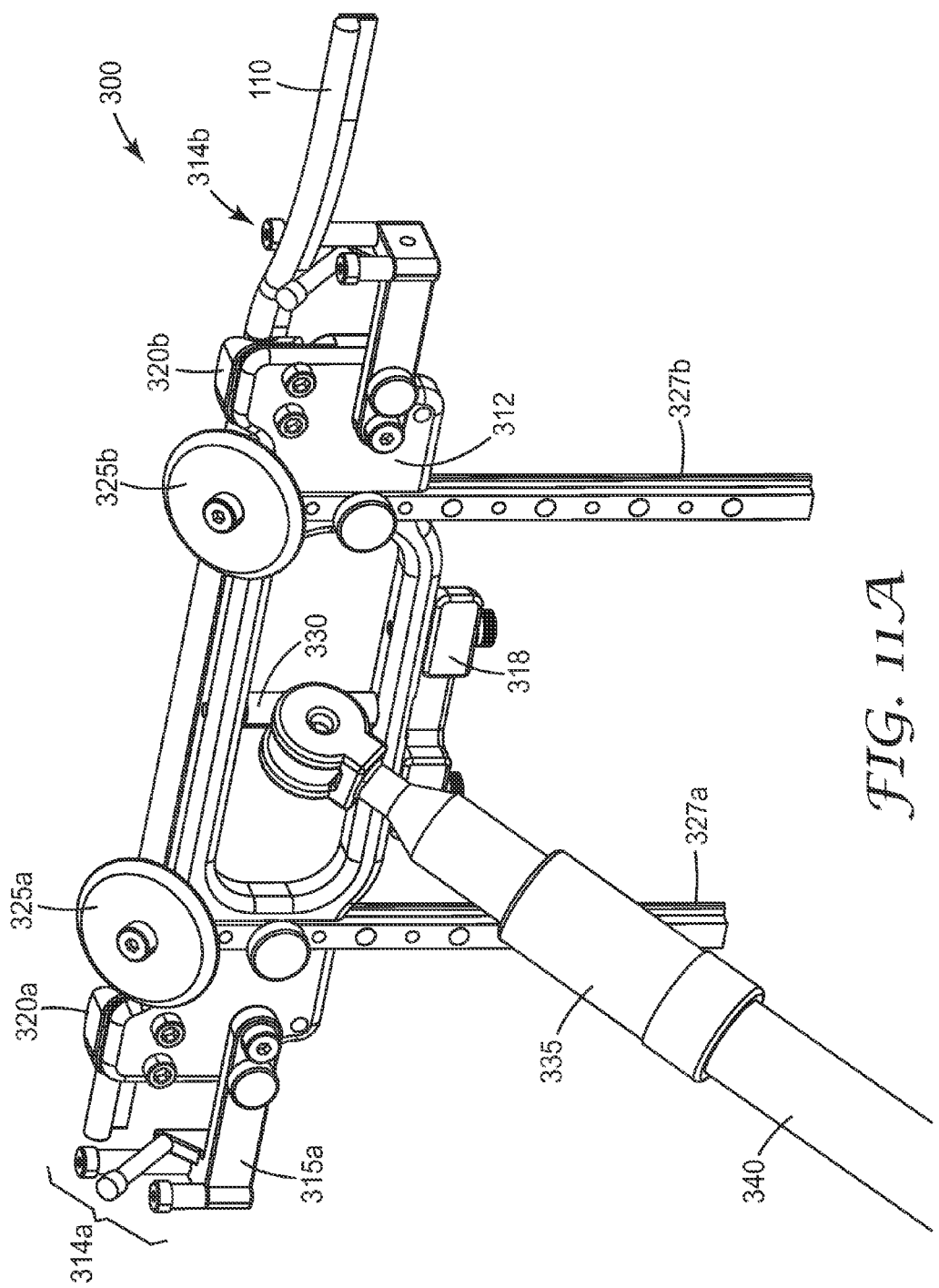
FIGS. 11A-11C show different views of a duct applicator tool according to another aspect of the invention.
Figure 11B:
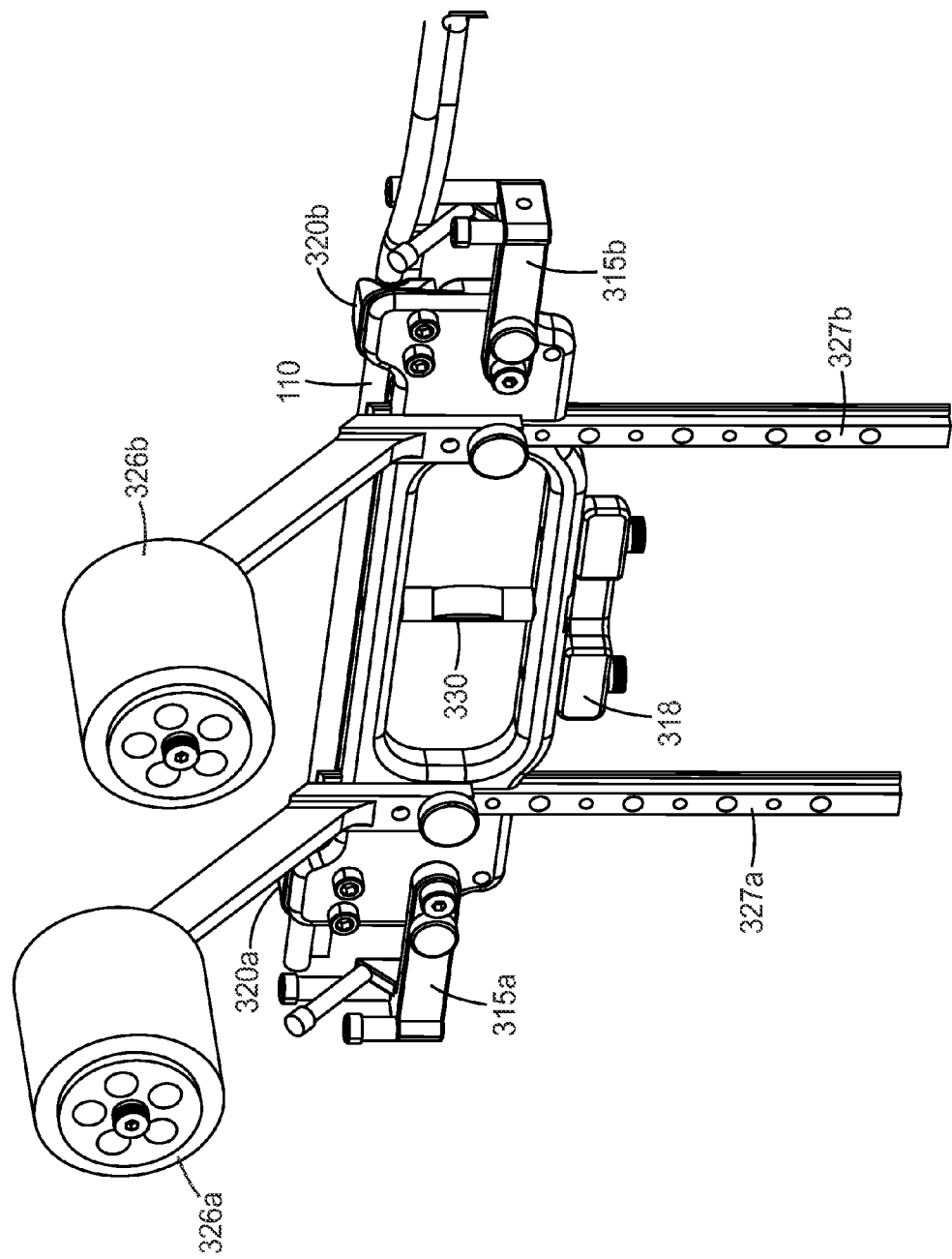
Figure 11C:
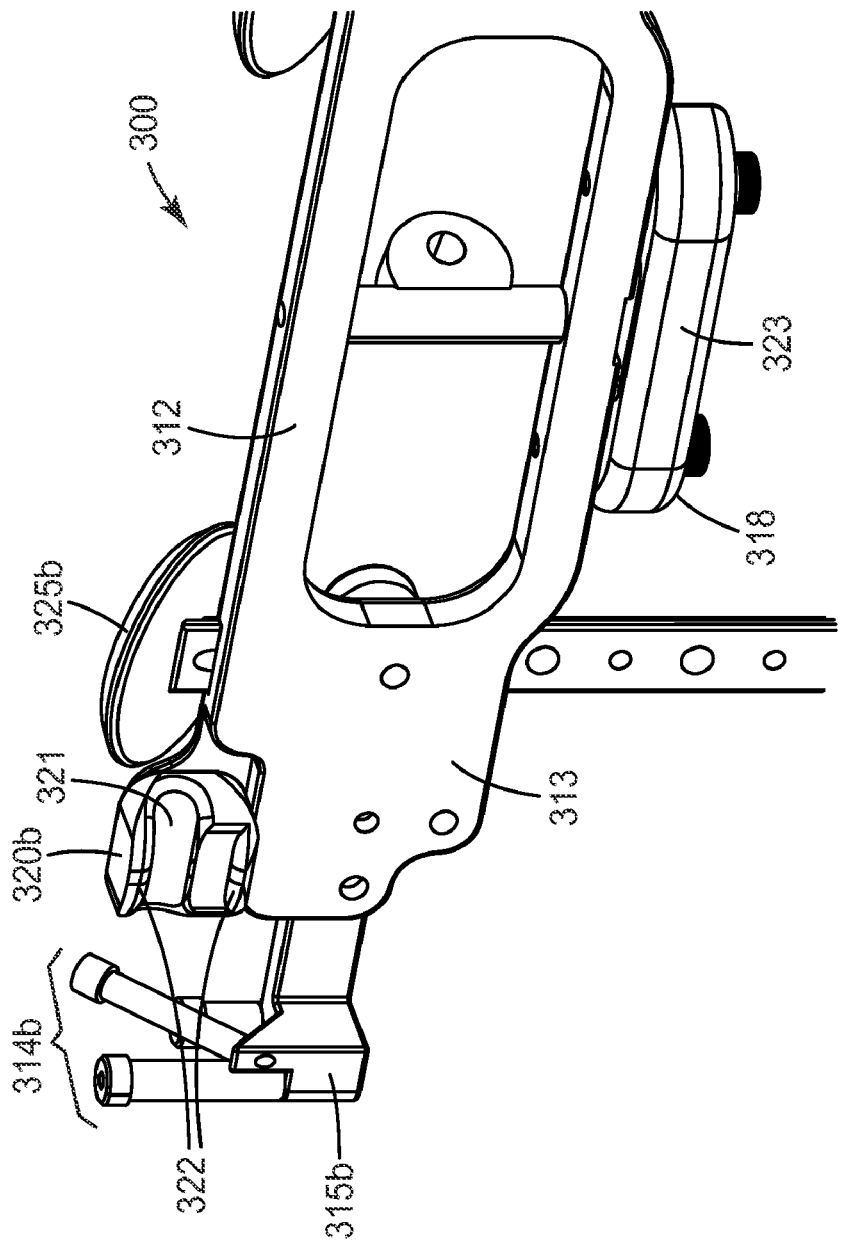

As mentioned above, the drop access system 100, 200 or 200' can be installed using an exemplary installation tool and system. For example, FIGS. 11A-11C show a duct applicator tool 300 that can be used to install duct, such as duct 110, 110', 210 410 described herein, onto a wall of an MDU or other living unit structure. The tool 300 can be handheld or it can be attached to an extendable pole 340 or other device as needed. For example, the tool 300 can be housed in a cart or other vehicle. As such, tool 300 and cart can be operated manually or at least partially motor-driven or otherwise powered. In another aspect, FIGS. 15A-15B show an alternative duct applicator tool 600 that can be used to install duct, such as duct 110, 110', 210 410 described herein, onto a wall of an MDU or other living unit structure. The tool 600 can be handheld or it can be attached to an extendable pole 340 or other device as needed.

The duct 110 can be formed the same as or similarly to duct 110, duct 110' or duct 210 described previously herein or to an alternatively shaped duct, such as duct 410 or duct 410' shown in FIGS. 13A and 13B and as described in more detail below. In another aspect, the flange surface of the duct 110 comprises an adhesive-lined surface with a removable liner. In an alternative aspect, the flange surface of the duct can comprise an adhesive that does not utilize a release liner. In a preferred aspect, the duct 110 is populated with communication fibers and/or electrical lines prior to installation. The communication fibers can be of various sizes and/or forms. In one aspect, the communication fibers can be bend-insensitive fibers, having a 900 µm buffered construction, such as those described previously. Access to fibers contained in the duct can be provided through a continuous slit or through window cuts made in the duct at specific locations.

Figure 13A:
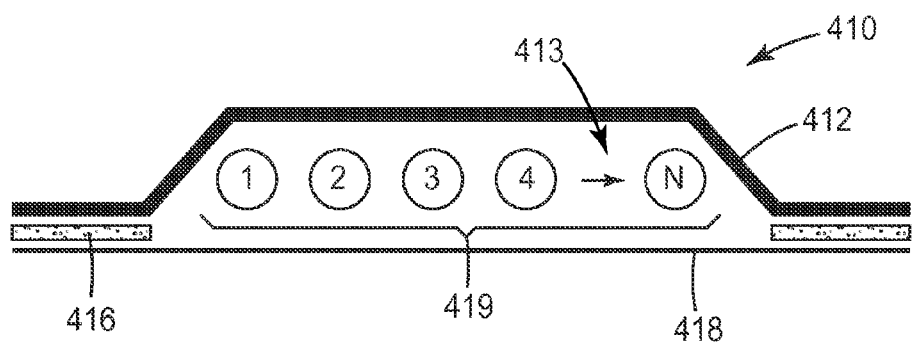
FIGS. 13A and 13B show cross section views of alternative ducts according to other aspects of the invention.
Figure 13B:
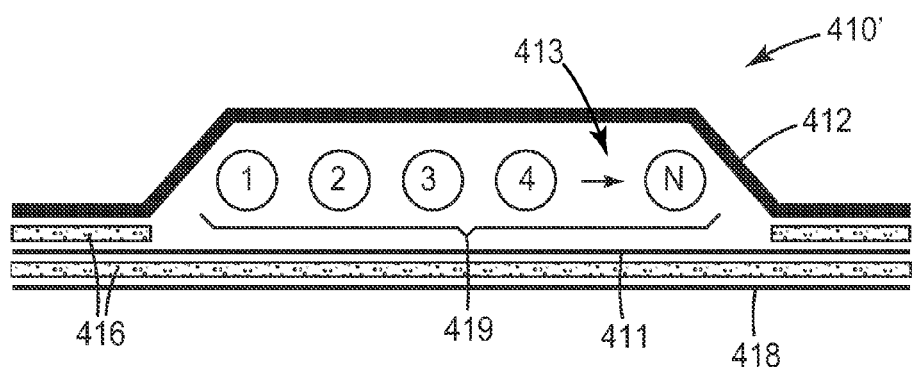

FIGS. 13A and 13B show cross-section views of alternative ducts 410 and 410'. In the alternative aspect shown in FIG. 13A, the duct 410 comprises a low-profile, adhesive-backed ribbon fiber tape. The duct 410 includes a cover material 412 that may be formed from a label stock material. Alternatively, cover material 412 can be formed from an extrusion, such as a PVC material. In a preferred aspect, the cover material 412 can be selected to provide flame resistance, such as V0 flame resistance for agency listing. The cover material 412 can be a paintable material, or, in a further alternative, cover material 412 may be covered with a decorative molding or wall paper. Optical fibers 419 (shown as fibers 1-N) are disposed in a cavity portion formed between cover material 412 and the wall or surface of installation. An adhesive 416 is disposed on a mounting side of the cover material outside the cavity region 413. The adhesive backing may include a releasable liner 418.

In the further alternative aspect shown in FIG. 13B, the duct 410' comprises a low-profile, adhesive-backed ribbon fiber tape. In this aspect, a base sheet 411 is provided between the cover material 412 and the wall or surface of installation. An additional adhesive bonds the base sheet 411 to the wall-side of the cover material 412.

The optical fibers 419 can be disposed within cavity 413 as free floating for straightforward extraction via a window cut or a slit over the preferred fiber. In this configuration, excess fiber can be freely pulled from within the cavity 413 for storage and termination within the access box 150, thus available for service delivery to a living unit. The liner 418 is removed at the time of application of the duct to the wall or surface of installation.

Referring back to FIGS. 11A-11C, duct applicator tool 300 includes a generally planar frame 312 formed of a rigid material such as a metal or plastic. The frame 312 supports duct channels 320a and 320b that receive the duct to be applied and provide a support surface that places a pressing force onto the duct 110 as the duct is applied to a wall or other surface. The duct channels 320a and 320b are disposed on the wall-side surface 313 of tool 300 and can conform to the shape of the duct to provide more uniform support. For example, as shown in FIG. 11C, duct channel 320b includes a groove 321 configured to conform to the shape of the duct 110. In one aspect, the duct channels 320a and 320b are formed of a Teflon material that can easily slide over the surface of the duct. In an alternative aspect, duct channels 320a and 320b can be configured as rollers. By having the tool 300 pass smoothly over the duct, the likelihood of wall markings or other damage can be reduced.

One or more duct guides 315a, 315b are also provided to help guide the duct from its storage reel (not shown) or other location to the tool 300, and in particular, to the duct channels 320a, 320b. The one or more duct guides 315a, 315b can be disposed on or extend from either or both ends of the frame 312. Although two duct guides are shown in FIGS. 11A and 11B, a duct applicator tool having only a single duct guide can also be utilized. The one or more duct guides 315a, 315b can include a set of posts 314a, 314b, that slidingly or rollingly receive the duct 110 as it is fed to the tool 300. The set of posts 314a, 314b can also provide a surface that helps pull off the release liner of the duct 110 as the duct is continuously applied to the wall or other surface. Thus, the tool 300 can remove the adhesive liner of the duct while traveling along the length of the hallway, exposing the adhering surface to the wall just before adhesion.

As also mentioned above, the duct 110 can be mounted to the wall or other surface at a pre-selected (and adjustable) height, such as above the doorways of the living units or along the base board of the hallway. Accordingly, duct applicator tool 300 includes a position adjustment mechanism, such as posts 327a, 327b. These posts 327a, 327b can be adjusted depending on the desired height of the duct location. In one aspect, as shown in FIG. 11A, the posts can be coupled to guide wheels 325a, 325b that ride along a reference surface, such as the bottom surface of hallway crown molding (keeping the tool at the same height from the crown molding as the tool is translated left or right along the wall) or along the top of a baseboard. In this manner, the duct can be applied substantially parallel to the reference surface. In a preferred aspect, the wheels 325a, 325b are low resistance, non-marring wheels.

In another aspect, as is shown in FIG. 11B, the posts 327a, 327b can be coupled to rollers 326a, 326b, that can roll along the surface of the ceiling and can place the tool 300 at a certain height below the ceiling of a hallway. In addition, these rollers can be formed from different materials to provide for a stable and smooth translation of the tool along the wall, depending on the type of reference surface (e.g., flat, textured, etc.) being used. In a further alternative aspect, the wheels may be covered with a woven or conformable material to provide a smooth travel over rough surfaces.

In one aspect, in order to conform to the surface of the wall that is receiving the duct, the tool 300 can include multiple contact points. For example, tool 300 can contact the wall or mounting surface at contact points 322 (see FIG. 11C, which shows a rear-side view of tool 300) formed on both duct channels 320a, 320b (only the rear side of duct channel 320b is shown in FIG. 11C). In addition, one or more additional mounting structures 318 can be mounted on frame 312 to provide an additional contact surface or surfaces 323. The contact surface or surfaces can be configured to minimize the rocking of the tool 300 towards or away from the wall or mounting surface during the application process.

As mentioned above, the tool 300 can be handheld or it can be attached to a pole 340 or other device as needed. For example, as shown in FIG. 11A a handle 335 can be provided on a swivel post 330 (enabling at least left-right motion and also up-down motion) to make it more straightforward to push the tool along the wall in either direction. The handle 335 can be configured to be gripped by an installer's hand and/or accommodate an extension pole or post 340. The extension pole or post 340 allows the installer to continuously use the tool 300 to install duct at higher location without having to repeatedly climb and move a ladder. Optionally, the handle 335 can further include a spring or other resistance element to provide an indication to the installer that the appropriate pressing force is being made during installation. Alternatively, a secondary tool having a spring or other resistance element can be used to travel back over the duct to ensure a sufficient force has been applied to the duct after the initial installation. As shown in FIGS. 11A-11C, the swivel post 330 is disposed in a central portion of the frame 312. In an alternative aspect, the swivel post 330 can be mounted on a different portion of the frame 312 to provide further stabilization depending on, e.g., the reference surface to be used for installation or the height at which the system is to be installed.

Prior to use of the tool 300 for installation of the duct, the duct 110 can pre-filled with fiber (not shown) and/or electrical wires (not shown). For fiber applications, in one aspect, the fibers can be pre-terminated on one end with a fiber optic connector(s), such as a conventional SC connector or a conventional MT connector. Optionally, the duct 110 can be supplied without connectors on either end, where the fibers can be terminated in the field with a mechanical connector or splice, or a fusion connector or splice.

In another aspect, the duct 110 can be rolled onto a reel in bulk or in custom cut lengths for deployment at the installation site. The connectorized end of the fiber duct can be fed into a terminal box (e.g., FDT 65 described above) and anchored appropriately. The duct 110 can be fed directly into the FDT, or through a series of conduits/walls, to arrive at the FDT.

Also, prior to installation, the wall where the duct is to be mounted may be tested and cleaned to ensure proper adhesion. For example, a test rod or weighted bar having the same adhesive backing may be utilized to test the sufficiency of adhesion.

During installation, the duct 110 is continuously fed to the tool 300 from a storage reel, which can be placed on a cart. The installer can map out the height and location of the installation and establish a starting location. At this location, a portion of the release liner can be removed and held against the wall via tape. Also, optionally, prior to installation, liner sheets can be placed over surface irregularities (such as steps or sharp bumps). Later, during installation, as the tool travels along the wall to a particular surface irregularity, the duct is placed over the pre-placed liner sheets, ensuring that the duct travels smoothly along the surface irregularity. After the tool has passed by, the liner sheet can be removed and the duct can be realigned or leveled by hand. In one aspect, the liner sheets can include a release agent to prevent the duct from adhering to the wall surface for such later repositioning.

In an alternative aspect, FIGS. 15A-15B show an alternative duct applicator tool 600. Tool 600 includes a generally planar frame 612 formed of a rigid material such as a metal or plastic. The frame 612 supports duct channels 620a and 620b that receive the duct to be applied and provide a support surface that places a pressing force onto the (pre-filled) adhesive-backed duct 110 as the duct is applied to a wall or other surface. In this aspect, the duct channels 620a and 620b are formed as slotted wheels or rollers that conform to the shape of the duct that rotate over the duct 110 as the duct is installed to provide more uniform support. By having the tool 600 pass smoothly over the duct, the likelihood of wall markings or other damage can be reduced.

One or more duct guides 615a, 615b are also provided to help guide the duct from its storage reel (not shown) or other location to the tool 600, and in particular, to the duct channels 620a, 620b. The one or more duct guides 615a, 615b can be adjustably mounted onto the frame 612 and can be disposed on or extend from either or both ends of the frame 612. In addition, one or more of the duct guides 615a, 615b can be disposed on the frame 612 at an angle such that, for example, duct guide 615b can be angled away from the wall or mounting surface. This angled position can reduce the amount of force required to move the tool 600 along the wall or other surface. In another aspect, although two duct guides are shown in FIGS. 15A-15B, a duct applicator tool having only a single duct guide can also be utilized. Moreover, the one or more duct guides 615a, 615b can be formed from a strong, durable material to provide impact/damage resistance to the tool.

At least one of the duct guides 615a, 615b can include a liner remover flange 614a that slidingly receives the duct 110 as it is fed to the tool 600 and provides a surface that helps continuously pull off the release liner of the duct 110 as the duct is continuously applied to the wall or other surface. The liner removal direction is signified by arrow 3 in FIG. 15A, where the liner can be further guided in the appropriate direction by guide structure 627a. In an alternative aspect, the liner remover flange 614a can be reformed or replaced as a post and roller structure (not shown) that can smoothly support and redirect the removed liner as the tool is advanced along the wall or other surface. Thus, the tool 600 can remove the adhesive liner of the duct while traveling along the length of the hallway, exposing the adhering surface to the wall just before adhesion.

Duct applicator tool 600 includes a position adjustment mechanism, such as posts 627a, 627b that can be adjusted depending on the desired height of the duct location. The posts can be coupled to guide wheels 625a, 625b (FIG. 715A has the guide wheels removed for simplicity) that ride along the bottom surface of the ceiling or hallway crown molding (keeping the tool at the same height from the ceiling/crown molding as the tool is translated left or right along the wall) or along the top of a baseboard. In a preferred aspect, the wheels 625a, 625b are low resistance, non-marring wheels. In addition, in this aspect, wheels 625a, 625b can space the tool from the ceiling so that the duct 110 is placed at a position from about 0.25 inches to about 4 inches from the ceiling.

In another aspect, as is shown in FIG. 15B, the tool 600 can also include rollers 626a, 626b, that can place the tool 600 at a certain height below the ceiling of a hallway. In addition, these rollers 626a, 626b can be formed from different materials to provide for a stable and smooth translation of the tool along the wall, depending on the type of reference surface (e.g., flat, textured, etc.) being used. In a further alternative aspect, the wheels may be covered with a woven or conformable material to provide a smooth travel over rough surfaces.

Tool 600 can further contact the wall or mounting surface with support wheels 622a, 622b for greater stability during installation.

Tool 600 can be handheld or it can be attached to a pole or other device as needed. For example, a swivel mount mechanism 630 (enabling at least left-right motion and also up-down motion) can be provided to make it more straightforward to push the tool along the wall in either direction. In one aspect, the swivel mechanism 630 can include a ball joint/socket construction. The swivel mechanism can be tightened or loosened by the installer, as desired, to provide a desired amount of swiveling action or to lock in the angle of orientation of the handle. In some aspects, the mechanism 630 can be coupled to an extension rod or post (not shown) mounted on end surface 631 that allows the installer to continuously use the tool 600 to install duct at a higher location without having to repeatedly climb and move a ladder.

In another aspect, tool 600 can also include a pressure mechanism 650 coupled to the swivel mount mechanism 630 to provide an indication to the installer that the appropriate pressing force is being made during installation. In this alternative aspect, the pressure mechanism 650 can include one or more compressions springs 652a, 652b or other resistance element(s) coupled to a support plate structure having multiple plates 654a, 654b, 654c (where plate 654c is shown in FIG. 15B) that are further coupled to the swivel mount mechanism 630.

In operation, an installer presses the tool against a wall or other surface, such that duct channels 620a and 620b and support wheels 622a, 622b contact the wall or other surface. When a certain amount of pressing force is applied, the pressure mechanism 650 releases from a "parked" or non-operating position to an operating position. In the operating position, the pressure mechanism 650 provides a floating resistance to the swivel mount mechanism 630. The release of the pressure mechanism 650 releases from the "parked" position indicates that an appropriate amount of force is being placed on the tool/duct to ensure sufficient adherence of the duct 110 to the wall or other surface. The spring force can be adjusted (e.g., by changing the springs) to accommodate for different duct sizes, shapes and adhesion requirements. As such, a secondary tool to travel back over the duct to ensure that a sufficient force has been applied to the duct is not required in this aspect.

As with previous aspects described above, the duct 110 can pre-filled with fiber (not shown) and/or electrical wires (not shown). For fiber applications, in one aspect, the fibers can be pre-terminated on one end with a fiber optic connector(s), such as a conventional SC connector or a conventional MT connector, via coupling or other adapter, at the factory. Optionally, the duct 110 can be supplied without connectors on either end, where the fibers can be terminated in the field with a mechanical connector or splice, or a fusion connector or splice.

As with previous aspects, the duct 110 can be rolled onto a reel in bulk or in custom cut lengths for deployment at the installation site. The connectorized end of the fiber duct can be fed into a terminal box (e.g., FDT 65 described above) and anchored appropriately. The duct 110 can be fed directly into the FDT, or through a series of conduits/walls, to arrive at the FDT.

During installation, the duct 110 is continuously fed to the tool 600 from a storage reel from either the left-hand or right-hand side of the device. The installer can map out the height and location of the installation and establish a starting location. At this location, a portion of the release liner can be removed and held against the wall via tape. Also, optionally, prior to installation, liner sheets can be placed over wall irregularities (such as steps or sharp bumps). Later, during installation, as the tool travels along the wall to a particular wall irregularity, the duct is placed over the pre-placed liner sheets, ensuring that the duct travels smoothly over the wall irregularity. After the tool has passed by, the liner sheet can be removed and the duct can be realigned or leveled by hand.

For corners, corner bend control pieces 501 and 551 (see FIGS. 14A-14D, for inner and outer corners) can be installed in an appropriate corner location prior to the duct 110 being installed. In a preferred aspect, the corner bend control pieces 501, 551 can be curved so that the duct 110 and the communications lines contained therein, especially the fibers, are not subjected to over bending. For aesthetics, the corner pieces can have a low profile.

Figure 14A:
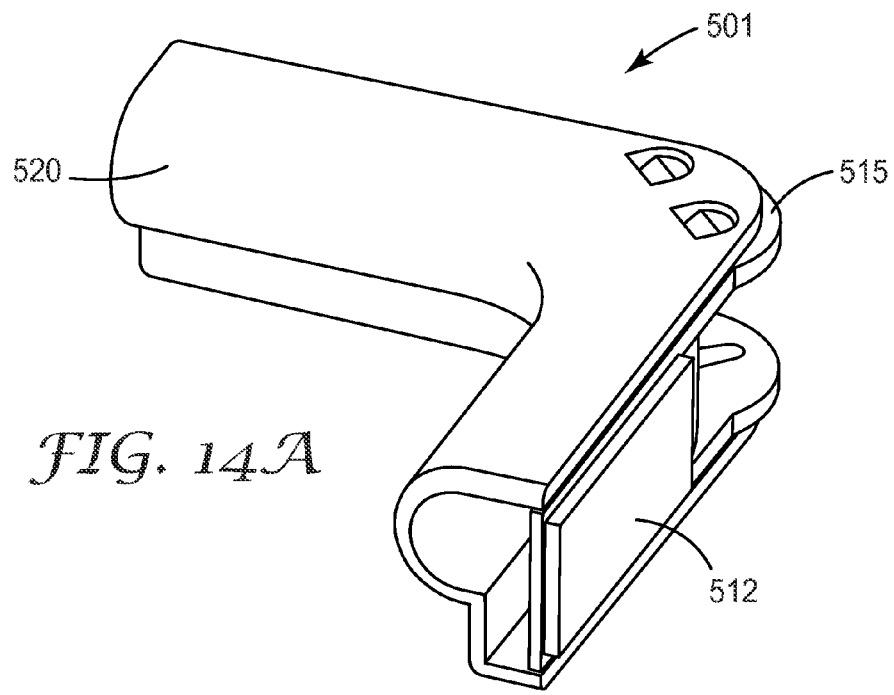
FIGS. 14A and 14B show exemplary corner pieces for use during installation of the drop access location system.
Figure 14B:
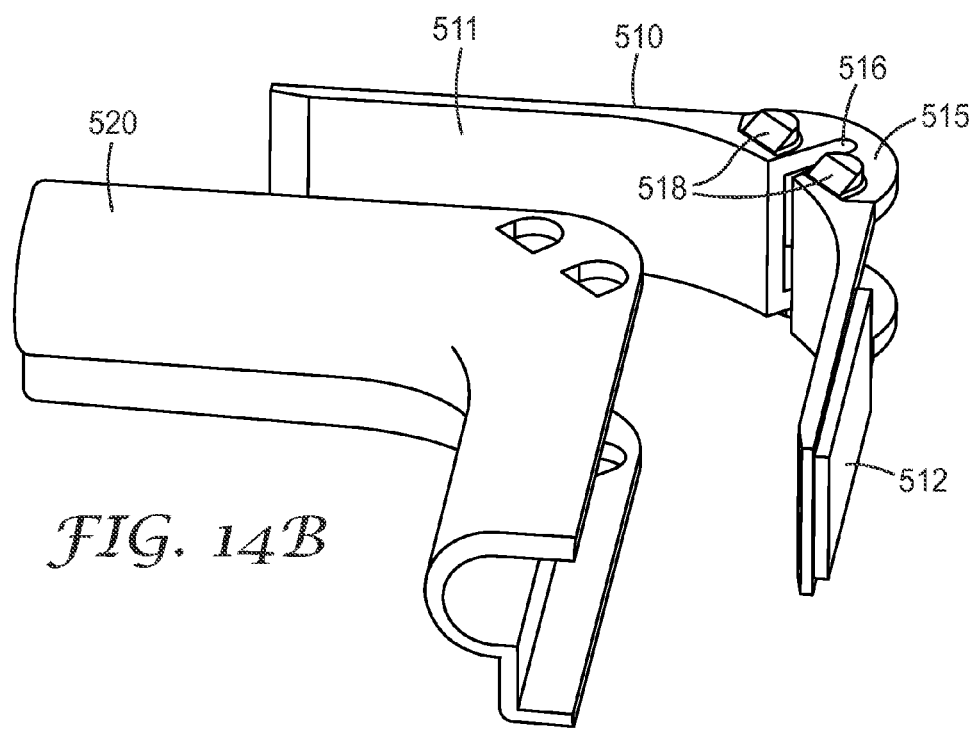

For example, FIGS. 14A and 14B show an exemplary corner piece 501 that is configured to cover an inner corner of a room or hallway. In this aspect, corner piece 501 can have a two piece construction and can be formed of a suitably rigid material, such as a rigid plastic material or metal. A base part 510 can be mounted to a wall or other surface. In this aspect, base part 510 includes an adhesive backing 512 to mount to the wall. A cover part 520 covers the base part 510. The base part can include a flexing corner portion 515 that can conform to a wall, even if the wall does not have a perfect right angle corner. In the aspect of FIGS. 14A and 14B, a slot 516 can be formed in the corner portion 515 of the base part 510 to allow flexing of the base part 510 at an angle greater than 90° or less than 90°. In operation, base part 510 can be mounted to an inner corner prior to application of the duct. Upon reaching the corner part 510, the duct can be mounted on outer facing surface 511, which bends at a sufficient bend radius at the corner to prevent over-bending damage to the duct or lines within. After mounting the duct, the cover part 520 can be fastened to the base part 510 using a conventional fastening mechanism. In this aspect, exemplary snap features 518 are utilized. In one aspect, as is shown in FIGS. 14A and 14B, the cover part 520 can have a shape that closely conforms to the outer shape of the duct, such as duct 110. Other shapes can also be utilized for aesthetics.

Figure 14C:
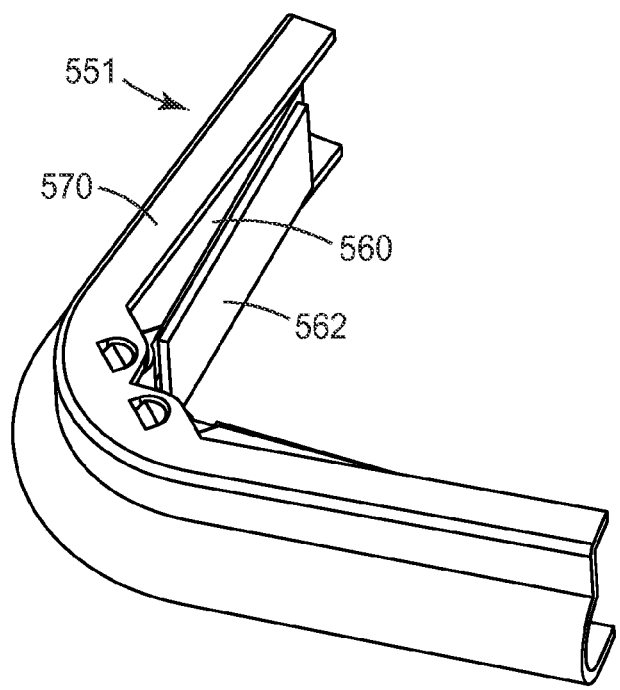
FIGS. 14C and 14D show exemplary outer corner pieces for use during installation of the drop access location system.
Figure 14D:
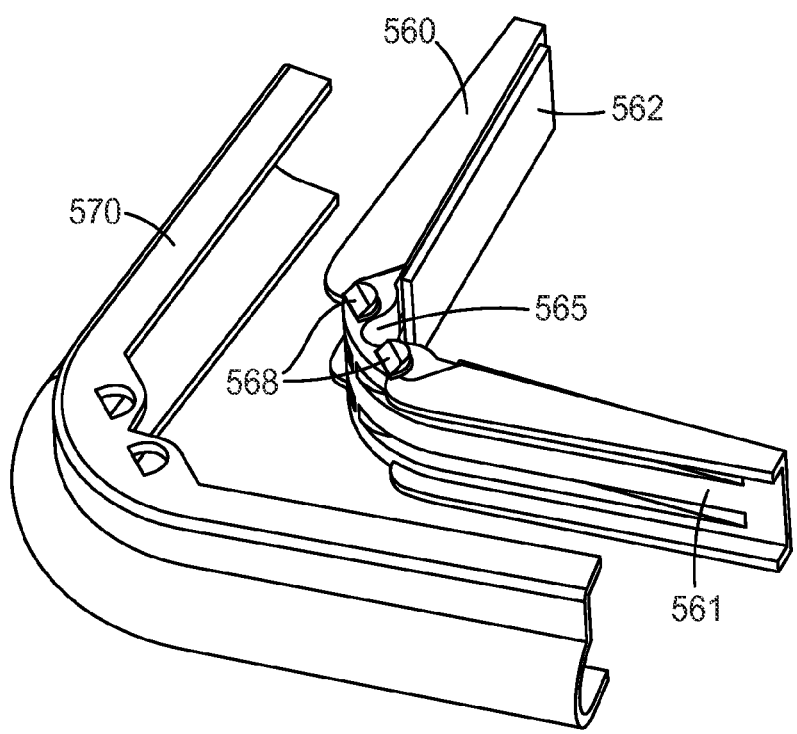

Similarly, for outer corners, an outer corner piece 551 can be provided, as is shown in FIGS. 14C and 14D. Corner piece 551 can have a two piece construction, where a base part 560 includes, for example, an adhesive backing 562 that mounts to a wall at an outer corner, and where a cover part 570 covers the base part 560. In the aspect of FIGS. 14C and 14D, a corner portion 565 of the base part 560 can be constructed so as to allow flexing of the base part 560 for outer angles greater than 90° or less than 90°. In operation, base part 560 can be mounted to an outer corner prior to application of the duct. Upon reaching the corner part 560, the duct can be mounted on outer facing surface 561, which bends at a sufficient bend radius at the corner to prevent over-bending damage to the duct or lines within. After mounting the duct, the cover part 570 can be fastened to the base part 560 using a conventional fastening mechanism, such as snap features 568. In a preferred aspect, as is shown in FIGS. 14C and 14D, the cover part 570 can have a shape that closely conforms to the outer shape of the duct. Although not shown, in alternative aspects, the systems 100, 200, 200' can further utilize additional structures such as in-plane corner pieces, duct cover pieces, and bridges (which support the duct in damaged wall sections).

In addition, in an alternative aspect, the corner pieces can each comprise a one piece construction. In a further alternative, a living hinge can be utilized to close the cover onto the base portion.

The drop access location method and system described herein can lower the installation cost of a critical segment of the FTTX network by offering increased speed and ease of deployment. The system components can also be designed to improve building hallway aesthetics important to owners and tenants, while at the same time providing a full function slack storage access box with cable storage, fiber management, splicing, and termination all within a single box. Furthermore, the installer can mount the drop access box directly over the duct. This approach further controls the sometimes intrusive nature imposed upon the building aesthetics and provides flexibility to the installer in terms of duct and box placement. As such, the installer can drill the necessary hole into the apartment/office within the closure even if the closure is located directly over a wall stud.

Moreover, conventional wall outlets most often have at least one connector exposed to the exterior of the box, making it susceptible to damage. Alternatively, larger conventional wall outlet boxes are frequently used to fully enclose the termination connectivity of both the distribution fiber and drop fiber. However, this conventional approach can be obtrusive and can negatively impact hallway aesthetics.

In contrast, the drop access location method and system described herein can fully enclose the termination connectivity. In addition, the drop access location method and system efficiently utilizes space above the distribution cable within a single molded part to provide space for a splice, connector, and other components without the requirement for larger boxes with additional components such as splice trays. The drop access location method and system described herein provides a network test access point without entering the FDT or a tenant's residence, therefore eliminating or reducing the potential for service disruption to other tenants. The system facilitates a reduced labor cost used to activate service as the drop cable to the customer is already pre-positioned outside the living unit, thereby avoiding the need to return and run a drop cable from the FDT to the ONT. The system also eliminates the potential for macrobends of drop cables requiring costly service calls and rerouting of fiber drop cables.

The drop access box can also be utilized within a living unit in cases where a service access point is desired without placement of the cable within a conventional wall outlet box (electrical box type). This surface-mounted wall box could be used as a connection point between the ONT and the distribution cable routed to the living unit.

Moreover, the drop access location system can be configured to accommodate a hybrid combination drop for providing communications and power service, including uninterrupted power service, to the ONT of an individual customer. This backup power can be supplied to each living unit on a particular floor from a single source, thus eliminating the need for a back-up battery in each individual ONT.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A system for communications access to a drop location, comprising:
   a duct having a conduit portion with a bore formed throughout and containing one or more communications lines and a mounting portion to mount the duct to a generally flat surface; and
   an access box including a base and a cover, the access box including a mounting section formed in the base, a slack storage section formed in at least one of the base and the cover, and a communications line coupling device mounting area disposed in the base, wherein the mounting section is configured to fit over an outer shape of the duct and overhang therefrom, wherein the mounting section includes a cut-out portion configured to fit over the outer shape of duct, wherein the slack storage section comprises one or more guides to route a communications line accessed from the conduit portion to the coupling device mounting area and to store excess amounts of the accessed communications line, and wherein the communications line coupling device mounting area is configured to receive at least one of a coupling, an adapter, and a splice that connects the accessed communications line to a drop cable.

2. The system of claim 1, wherein the coupling device mounting area is configured to receive at least one of a fusion splice, a mechanical splice, a coupling, and an adapter.

3. The system of claim 1, wherein the duct is formed from a flexible material.

4. The system of claim 1, wherein the one or more communications lines comprise one of a plurality of loose optical fibers and a fiber ribbon cable.

5. The system of claim 1, wherein the one or more communications lines comprise at least one of a coaxial cable, a copper communication wire, and an electrical wire.

6. The system of claim 1, wherein the accessed communications line comprises an optical fiber, and wherein the optical fiber is terminated to a field terminable optical fiber connector, and wherein the coupling device mounting area comprises an adapter configured to receive and connect two optical fiber connectors.

7. The system of claim 6, wherein the slack storage section includes one or more bend radius control structures to prevent the accessed optical fiber from exceeding its minimum bend radius.

8. The system of claim 1, wherein the drop cable comprises a pre-connectorized fiber pigtail.

9. The system of claim 1, wherein the duct mounting portion comprises a flange, and wherein the flange further includes an adhesive backing disposed on at least one surface thereof.

10. The system of claim 1, wherein the drop cable is coupled to an individual living unit in a multi-dwelling unit (MDU).

11. The system of claim 1, wherein the system is mounted in a hallway in one of an MDU, MTU, hotel, hospital, school, and apartment building.

12. The system of claim 1, wherein the access box, when covered with the removable cover, has a depth of from about 0.25 inches to about 1.5 inches.

13. The system of claim 1, wherein the mounting section further includes an overhanging bridge support disposed between the mounted duct and the removable cover, wherein the overhanging bridge support adds strength to the mounting section and covers an exposed accessed communications line.

14. The system of claim 1, wherein the duct comprises multiple longitudinal slits configured to provide separation of telecommunications services.

15. The system of claim 1, wherein the duct comprises a slit formed in the conduit portion to permit access to one or more of the communications lines disposed in the conduit portion.

16. The system of claim 5, wherein the one or more communications lines further comprise a power line, wherein the power line supplies at least one of uninterrupted DC power and AC power to an optical network terminal located in an individual living unit at the drop location.

17. The system of claim 1, wherein the duct further comprises an inner tube disposed in the bore of the conduit portion to permit insertion of an additional communication line for one of providing additional service and repair.

18. The system of claim 1, wherein the duct comprises a low-profile, adhesive-backed ribbon fiber tape.

19. A method for providing communications lines to the hallway of an existing MDU, MTU, or other similar residential or commercial building, comprising:
   installing a duct in the hallway of the building, wherein the duct includes one of a plurality of loosely packed buffered optical fibers and a ribbon fiber cable disposed in a conduit portion of the duct;
   accessing at least one optical fiber from the duct at a first fiber drop location;
   installing a first drop access box at the first drop location, wherein the first drop access box includes a base and a cover, the access box including a mounting section formed in the base, a slack storage section formed in the base, and a communications line coupling device mounting area disposed in the base, and wherein the access box is mounted onto the duct in an overhanging manner to cover the accessed fiber, wherein the mounting section includes a cut-out portion configured to fit over the outer shape of duct;
   terminating the accessed fiber;
   coupling the terminated accessed fiber to a coupling and mounting the coupling in the communications line coupling device mounting area; and
   routing and storing fiber slack from the accessed fiber through the slack storage section of the drop access box.

20. The method of claim 19, further comprising:
   accessing an individual living unit of the building at the first drop location, wherein a through hole is drilled into the hallway wall at the first drop location;
   feeding drop cable through the through hole location into the living unit; and
   connecting the drop cable to the accessed fiber via the communications line coupling.

21. The method of claim 19, wherein the duct is mounted to a wall of a building hallway via an adhesive at a pre-selected height above doorways of the living units.

* * * * *